(12) United States Patent
Wang et al.

(10) Patent No.: US 11,947,211 B2
(45) Date of Patent: Apr. 2, 2024

(54) DISPLAY PANEL AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Jing Wang, Beijing (CN); Yangyang Cai, Beijing (CN); Guojian Qu, Beijing (CN); Guangyun Tong, Beijing (CN); Fan Yang, Beijing (CN); Chengwei Wang, Beijing (CN); Zhanchang Bu, Beijing (CN); Bochang Wang, Beijing (CN); Yu Zhang, Beijing (CN); Hetao Wang, Beijing (CN); Xiang Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/908,343

(22) PCT Filed: Aug. 5, 2021

(86) PCT No.: PCT/CN2021/110713
§ 371 (c)(1),
(2) Date: Aug. 31, 2022

(87) PCT Pub. No.: WO2022/068386
PCT Pub. Date: Apr. 7, 2022

(65) Prior Publication Data
US 2023/0333426 A1 Oct. 19, 2023

(30) Foreign Application Priority Data

Sep. 30, 2020 (CN) .......................... 202011062446.9

(51) Int. Cl.
*G02F 1/1333* (2006.01)
*G02F 1/1335* (2006.01)
(Continued)

(52) U.S. Cl.
CPC .. *G02F 1/133528* (2013.01); *G02F 1/133504* (2013.01); *G02F 1/13363* (2013.01);
(Continued)

(58) Field of Classification Search
CPC ..................................................... G02F 1/1343
See application file for complete search history.

(56) References Cited

U.S. PATENT DOCUMENTS

2004/0056994 A1* 3/2004 Honda ................. G02B 5/0294
349/112
2007/0134438 A1 6/2007 Fabick et al.
(Continued)

FOREIGN PATENT DOCUMENTS

CN 1760740 A 4/2006
CN 2914134 Y 6/2007
(Continued)

OTHER PUBLICATIONS

International Search Report (with English translation) and Written Opinion for PCT/CN2021/110713, dated Nov. 1, 2021, 13 pages.

*Primary Examiner* — Sang V Nguyen
(74) *Attorney, Agent, or Firm* — Dority & Manning, PA

(57) ABSTRACT

A display panel includes: a liquid crystal cell; an optical layer configured to transmit part of light incident onto the optical layer whose polarization direction is parallel to a transmission axis of the optical layer, and reflect a remaining part of the light incident onto the optical layer; a first polarization structure configured to transmit part of light incident onto the first polarization structure whose polarization direction is parallel to a transmission axis of the first
(Continued)

polarization structure, and absorb a remaining part of the light incident onto the first polarization structure; and a second polarization structure configured to transmit part of light incident onto the second polarization structure whose polarization direction is parallel to a transmission axis of the second polarization structure, and absorb a remaining part of the light incident onto the second polarization structure.

19 Claims, 17 Drawing Sheets

(51) Int. Cl.
 *G02F 1/13363* (2006.01)
 *G02F 1/1337* (2006.01)
 *G09G 3/20* (2006.01)
(52) U.S. Cl.
 CPC ......... *G02F 1/1337* (2013.01); *G09G 3/2092* (2013.01); *G09G 2340/00* (2013.01)

(56) References Cited

U.S. PATENT DOCUMENTS

| | | | |
|---|---|---|---|
| 2011/0063548 A1* | 3/2011 | Yoshida | ............ G02F 1/133514 349/106 |
| 2013/0101816 A1* | 4/2013 | Liu | .......................... G02B 1/04 428/212 |
| 2014/0340753 A1 | 11/2014 | Kusama et al. | |
| 2015/0206478 A1* | 7/2015 | Yamazaki | .............. G09G 3/344 345/206 |
| 2015/0268497 A1* | 9/2015 | Lee | ..................... H01L 27/1262 438/30 |
| 2016/0025907 A1 | 1/2016 | Kusama et al. | |
| 2016/0195659 A1 | 7/2016 | Johnson et al. | |
| 2017/0031206 A1 | 2/2017 | Smith et al. | |
| 2017/0199428 A1 | 7/2017 | Lin et al. | |
| 2019/0204488 A1* | 7/2019 | Sakano | .................. G02F 1/1335 |
| 2019/0285918 A1* | 9/2019 | Li | .............................. G02F 1/29 |
| 2020/0081177 A1* | 3/2020 | Kashiwagi | ........... G02B 6/0051 |
| 2020/0089061 A1 | 3/2020 | Wang et al. | |
| 2020/0110292 A1 | 4/2020 | Kim et al. | |
| 2020/0133054 A1* | 4/2020 | Oshige | ................... H10K 59/88 |

FOREIGN PATENT DOCUMENTS

| | | | | |
|---|---|---|---|---|
| CN | 103217828 | A | 7/2013 | |
| CN | 103308967 | A | 9/2013 | |
| CN | 104155800 | A | 11/2014 | |
| CN | 208255590 | U | 12/2018 | |
| CN | 110426887 | A | 11/2019 | |
| CN | 110879494 | * | 3/2020 | ........... G02F 1/1335 |
| CN | 110879494 | A | 3/2020 | |
| CN | 210573108 | U | 5/2020 | |
| CN | 212623464 | U | 2/2021 | |
| KR | 20090103316 | A | 10/2009 | |

* cited by examiner (A)

(B)

DISPLAY PANEL AND DISPLAY APPARATUS

CROSS-REFERENCE TO RELATED APPLICATIONS

This application is a national phase entry under 35 USC 371 of International Patent Application No. PCT/CN2021/110713, filed on Aug. 5, 2021, which claims priority to Chinese Patent Application No. 202011062446.9, filed on Sep. 30, 2020, which are incorporated herein by reference in their entirety.

TECHNICAL FIELD

The present disclosure relates to the field of display technologies, and in particular, to a display panel and a display apparatus.

BACKGROUND

The reflective display apparatus mainly uses ambient light as a light source, and reflects the ambient light incident onto the display apparatus to achieve the display effect. Generally, a backlight module is not required to provide the light source. Therefore, the reflective display apparatus uses a relatively energy-saving and environment-friendly display mode and has a long service life.

SUMMARY

In an aspect, a display panel is provided. The display panel includes a liquid crystal cell, an optical layer, a first polarization structure and a second polarization structure. The liquid crystal cell includes a first substrate, a second substrate and a liquid crystal layer. The first substrate and the second substrate are disposed opposite to each other, and the liquid crystal layer is sandwiched between the first substrate and the second substrate. The optical layer is disposed on a side of the first substrate of the liquid crystal cell away from the second substrate. The optical layer is configured to transmit part of light incident onto the optical layer whose polarization direction is parallel to a transmission axis of the optical layer, and reflect a remaining part of the light incident onto the optical layer. The first polarization structure is disposed on a side of the optical layer away from the liquid crystal cell. The first polarization structure is configured to transmit part of light incident onto the first polarization structure whose polarization direction is parallel to a transmission axis of the first polarization structure, and absorb a remaining part of the light incident onto the first polarization structure. The second polarization structure is disposed on a side of the liquid crystal cell away from the optical layer. The second polarization structure is configured to transmit part of light incident onto the second polarization structure whose polarization direction is parallel to a transmission axis of the second polarization structure, and absorb a remaining part of the light incident onto the second polarization structure. The transmission axis of the first polarization structure is perpendicular to the transmission axis of the optical layer, and the transmission axis of the second polarization structure is perpendicular to or parallel to the transmission axis of the optical layer.

In some embodiments, the transmission axis of the second polarization structure is parallel to the transmission axis of the first polarization structure.

In some embodiments, the optical layer includes a plurality of first optical films and a plurality of second optical films. The plurality of first optical films are birefringent. The plurality of second optical films are single-refractive. In a direction perpendicular to a plane where the display panel is located, the plurality of first optical films and the plurality of second optical films are alternately stacked.

In some embodiments, one of a first optical film in the plurality of first optical films and a second optical film in the plurality of second optical films is directly bonded to the first polarization structure.

In some embodiments, in a first direction in a plane where the optical layer is located, a refractive index of the first optical film is greater than a refractive index of the second optical film. In a second direction in the plane where the optical layer is located, another refractive index of the first optical film is equal to the refractive index of the second optical film, and the first direction is perpendicular to the second direction.

In some embodiments, the transmission axis of the optical layer is in a range of 0° to 180°, inclusive. The transmission axis of the optical layer is parallel to a plane where the display panel is located.

In some embodiments, the display panel further includes a scattering film. The scattering film is disposed on a side of the liquid crystal cell proximate to the optical layer and between the liquid crystal cell and the optical layer.

In some embodiments, the optical layer includes the plurality of first optical films and the plurality of second optical films. The plurality of first optical films are birefringent, and the plurality of second optical films are single-refractive. In a direction perpendicular to a plane where the display panel is located, the plurality of first optical films and the plurality of second optical films are alternately stacked. One of a first optical film in the plurality of first optical films and a second optical film in the plurality of second optical films is directly bonded to the scattering film.

In some other embodiments, the display panel further includes a scattering film.

The scattering film is disposed on the side of the liquid crystal cell away from the optical layer.

In some embodiments, a scattering axis of the scattering film is in a range of 0° to 90°, inclusive. An included angle between the scattering axis and a direction perpendicular to a plane where the display panel is located is in a range of 0° to 75°, inclusive.

In some embodiments, the display panel further includes an anti-reflection film. The anti-reflection film is disposed on a side of the second polarization structure away from the optical layer.

In some embodiments, the liquid crystal cell further includes a first alignment layer and a second alignment layer. The first alignment layer is disposed on the first substrate and on a side of the first substrate proximate to the liquid crystal layer. The first alignment layer has a first alignment direction. The second alignment layer is disposed on the second substrate and on a side of the second substrate proximate to the liquid crystal layer. The second alignment layer has a second alignment direction. The first alignment direction is parallel or perpendicular to the second alignment direction.

In some embodiments, the first alignment direction is parallel to the second alignment direction, and the second alignment direction is perpendicular to the transmission axis of the second polarization structure.

In some embodiments, the liquid crystal cell further includes first electrodes and at least one second electrode. The first electrodes are disposed on the first substrate. The at least one second electrode is disposed on the first substrate.

The first electrodes are farther away from the liquid crystal layer than the at least one second electrode. The second electrode is a slit electrode, and the first electrodes are planar electrodes.

In some embodiments, the first alignment direction is perpendicular to the second alignment direction, and the second alignment direction is parallel to the transmission axis of the second polarization structure. The liquid crystal cell further includes first electrodes and a second electrode. The first electrodes are disposed on the first substrate. The second electrode is disposed on the second substrate. The first electrodes and the second electrode each are a planar electrode.

In some embodiments, the liquid crystal cell further includes a plurality of filter layers. The plurality of filter layers are disposed on the second substrate and on a side of the second substrate proximate to the liquid crystal layer. Thicknesses of the plurality of filter layers are each in a range of 0.3 μm to 3 μm, inclusive.

In some embodiments, the liquid crystal cell further includes an electrostatic shielding pattern. The electrostatic shielding pattern is disposed on the second substrate and on a side of the second substrate proximate to the liquid crystal layer.

In another aspect, a display apparatus is provided. The display apparatus includes the display panel in any one of the above embodiments.

In some embodiments, the display apparatus further includes a data processor. The data processor is coupled to the display panel. The data processor is configured to invert input first image data to obtain second image data. The display panel is configured to display an image according to the second image data.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
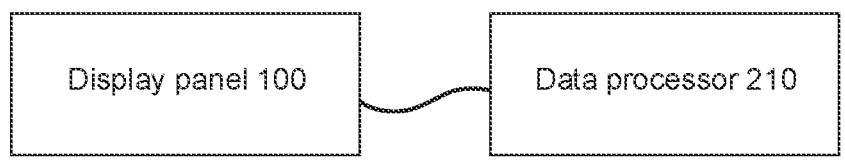
FIG. 1 is a structural diagram of a display apparatus, in accordance with some embodiments.

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description, the term such as "one embodiment", "some embodiments", "exemplary embodiments", "example", "specific example" or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or examples(s). In addition, specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with the term such as "first" or "second" may explicitly or implicitly include one or more features. In the description of the embodiments of the present disclosure, "a plurality of" or "the plurality of" means two or more unless otherwise specified.

In the description of some embodiments, terms "coupled", "connected" and their derivatives may be used. For example, the term "connected" may be used in the description of some embodiments to indicate that two or more components are in direct physical or electrical contact with each other. For another example, the term "coupled" may be used when describing some embodiments to indicate that two or more components have direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The use of the phrase "applicable to" or "configured to" herein indicate an open and inclusive expression, which does not exclude devices that are applicable to or configured to perform additional tasks or steps.

The term such as "about" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

Embodiments of the present disclosure provide a display apparatus. The display apparatus is a total reflection display apparatus. For example, the display apparatus is a reflective display apparatus. The display apparatus is any apparatus that displays an image whether in motion (e.g., a video) or stationary (e.g., a static image), and whether literal or graphical. For example, the display apparatus may be a smart shelf label, a handheld reader, a display of a fitness device, or an outdoor billboard.

It will be noted that, a specific type of the display panel is not limited in the embodiments of the present disclosure, which may be selected according to actual needs. For example, the display panel may be a twisted nematic (TN) display panel, an in plane switching (IPS) display panel, an advanced super dimension switch (ADS) display panel, a fringe field switching (FFS) display panel or a vertical alignment (VA) display panel.

Figure 2:
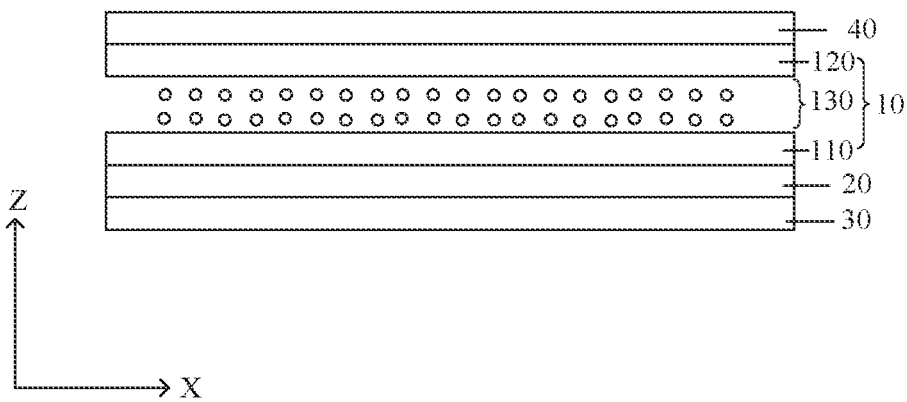
FIG. 2 is a structural diagram of a display panel, in accordance with some embodiments.

As shown in FIG. 1, the display apparatus 200 includes a display panel 100. As shown in FIG. 2, the display panel 100 includes a liquid crystal cell 10. The liquid crystal cell 10 includes a first substrate 110, a second substrate 120 and a liquid crystal layer 130. The first substrate 110 and the second substrate 120 are disposed opposite to each other. The liquid crystal layer 130 is sandwiched between the first substrate 110 and the second substrate 120.

The liquid crystal layer includes liquid crystal molecules. It will be noted that, the embodiments of the present disclosure do not limit a specific type of the liquid crystal molecules, which may be selected according to actual situations. For example, the liquid crystal molecules may be positive liquid crystal molecules or negative liquid crystal molecules. For example, the liquid crystal molecules may be nematic liquid crystal molecules suitable for the TN display panel, dye liquid crystal molecules, liquid crystal molecules suitable for the IPS display panel, liquid crystal molecules suitable for the VA display panel; liquid crystal molecules suitable for the FFS display panel, or liquid crystal molecules suitable for the ADS display panel. For example, the liquid crystal layer further includes dye molecules. For example, the dye molecules include dichroic dye molecules.

Figure 3A:
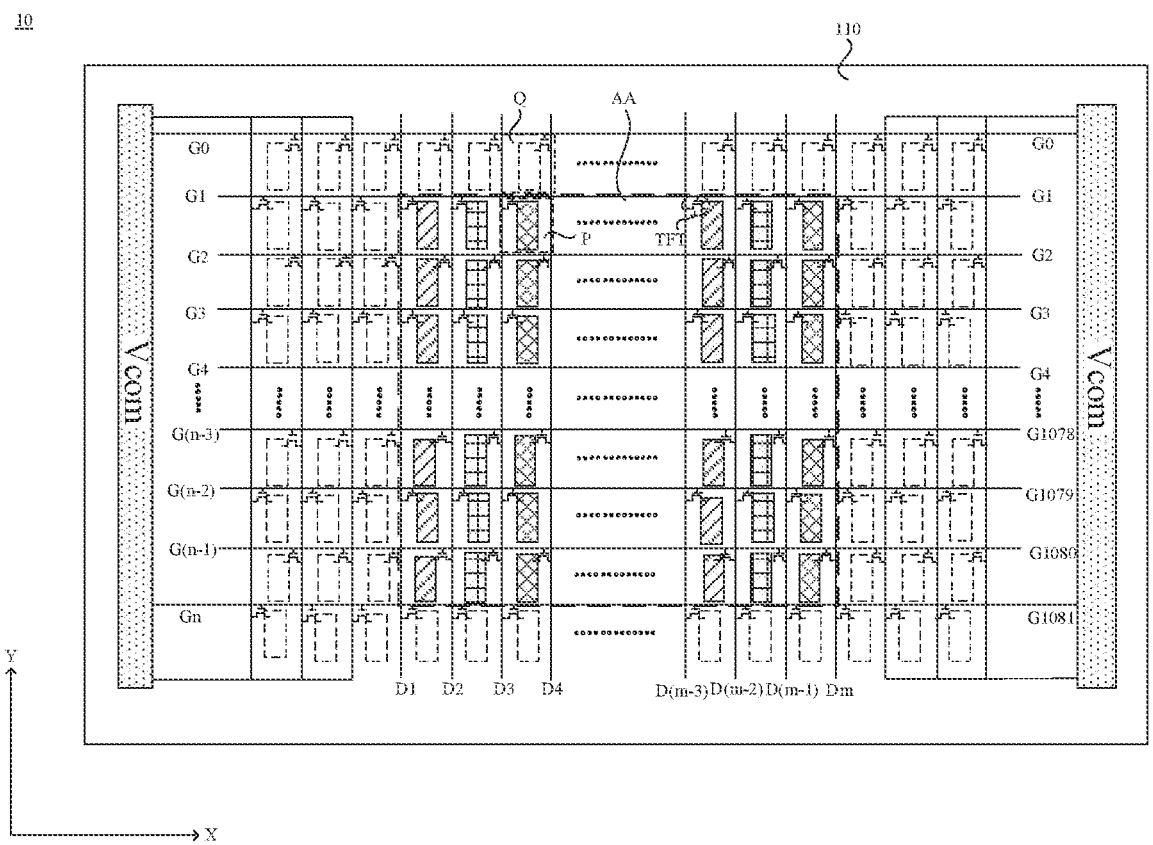
FIG. 3A is a structural diagram of a liquid crystal cell, in accordance with some embodiments of the present disclosure.

In some embodiments, as shown in FIG. 3A, the liquid crystal cell 10 has a display area AA. The display area AA includes a plurality of display sub-pixel areas P. The liquid crystal cell 10 further includes thin film transistors (TFTs) disposed on the first substrate 110. Each display sub-pixel area P is provided with a TFT therein.

Figure 3B:
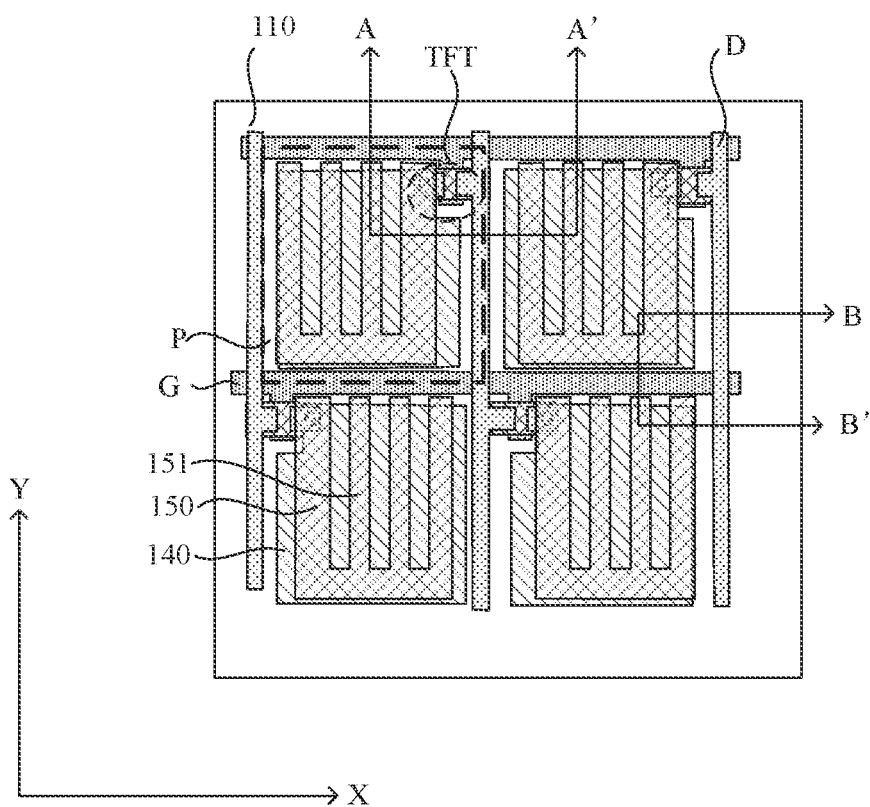
FIG. 3B is a structural diagram of another liquid crystal cell, in accordance with some embodiments of the present disclosure.

In some embodiments, as shown in FIG. 3B, the liquid crystal cell 10 further includes first electrodes 140 and second electrode(s) 150. For example, the first electrode 140 may be a pixel electrode, and the second electrode 150 may be a common electrode. For example, the first electrode 140 and the second electrode 150 may be located on the first substrate 110, the first electrode 140 and the second electrode 150 may be arranged in a same layer or in different layers. In this case, an array substrate including the first substrate 110, the first electrode 140 and the second electrode 150 may be obtained, and an opposite substrate including the second substrate 120 may be obtained. Alternatively, the first electrode 140 is located on the first substrate 110, and the second electrode 150 is located on the second substrate 120. In this case, an array substrate including the first substrate 110 and the first electrode 140 may be obtained, and an opposite substrate including the second substrate 120 and the second electrode 150 may be obtained. For example, the liquid crystal layer 130 is sandwiched between the opposite substrate and the array substrate.

Each display sub-pixel area P is provided a single first electrode 140 therein. In the display sub-pixel area P, the TFT is coupled to the first electrode 140.

For example, the first electrode 140 and the second electrode 150 are transparent. The first electrode 140 may be made of a transparent conductive material, and the second electrode 150 may be made of a transparent conductive material. For example, the transparent conductive material includes a metal oxide, such as indium tin oxide (ITO) or indium zinc oxide (IZO).

For example, as shown in FIG. 3A, the liquid crystal cell 10 includes a plurality of gate lines (G0 to Gn, n being a positive integer, e.g., n being 1081), a plurality of data lines (D1 to Dm, m being a positive integer greater than 1, e.g., m being 5761) and common conductive pattern(s) Vcom. The gate lines are configured to provide scan signals, the data lines are configured to provide data signals, and the common conductive pattern(s) are configured to provide a common signal. A TFT is coupled to a gate line and a data line, and a second electrode is coupled to a common conductive pattern. For example, a gate of the TFT is coupled to the gate line, a source of the TFT is coupled to the data line, and a drain of the TFT is coupled to a first electrode. The TFT is turned on in response to a scan signal, and transmits a data signal to the first electrode. The common conductive pattern transmits the common signal to the second electrode.

Figure 3C:
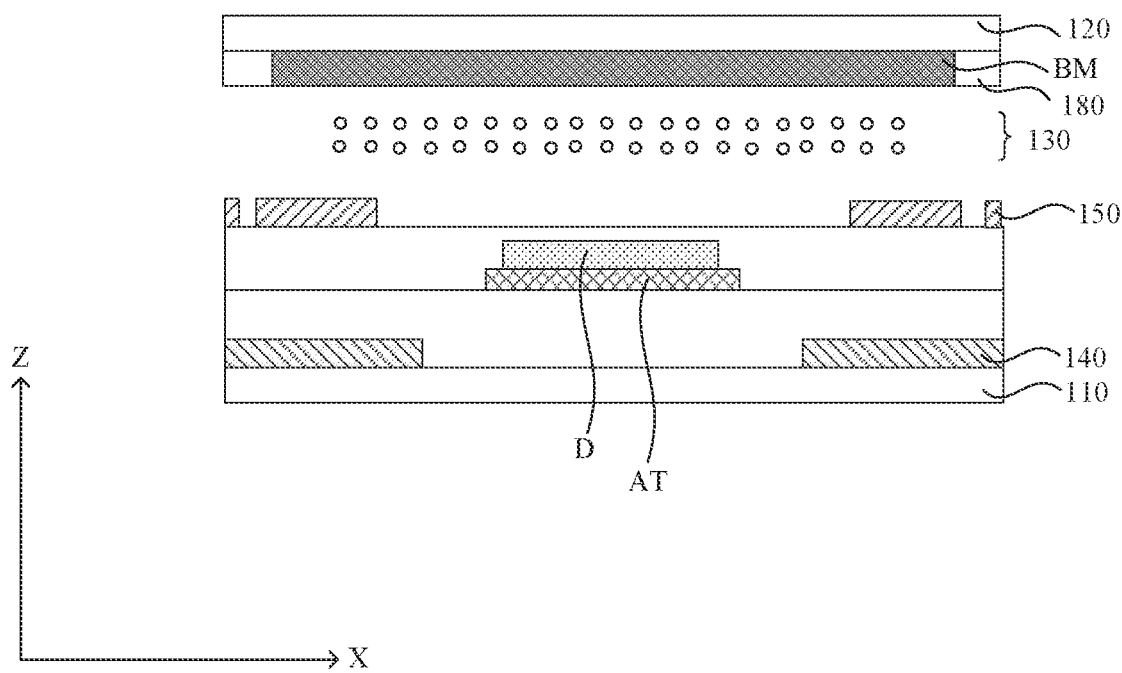
FIG. 3C is a sectional view of the liquid crystal cell in FIG. 3B taken along the line A-A'.
Figure 3D:
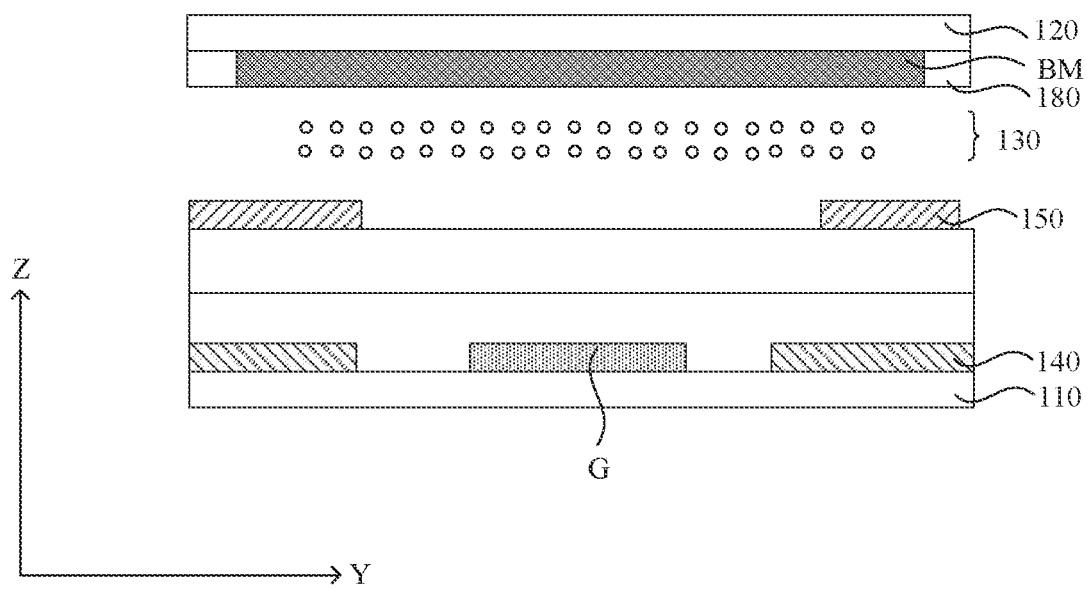
FIG. 3D is a sectional view of the liquid crystal cell in FIG. 3B taken along the line B-B'.

In some embodiments, as shown in FIGS. 3B to 3D, the first electrode 140 and the second electrode 150 may be located on the first substrate 110, and the first electrode 140 is farther away from the liquid crystal layer 130 than the second electrode 150. The second electrode 150 is a slit electrode, and the first electrode 140 is a planar electrode. For example, each display sub-pixel area P is provided with a single second electrode 150 therein.

For example, as shown in FIG. 3B, the second electrode 150 includes a plurality of portions 151, the plurality of portions 151 are disposed at intervals, and adjacent two portions 151 of the plurality of portions 151 provide a slit therebetween. An electric field created at an edge of the slit electrode and an electric field created between the slit electrode and the planar electrode may develop a multi-dimensional electric field. Therefore, liquid crystal molecules of all alignment directions located between slit electrodes and directly above the slit electrodes may rotate, which improves a working efficiency of the liquid crystal molecules and increases the light transmission efficiency.

Figure 3E:
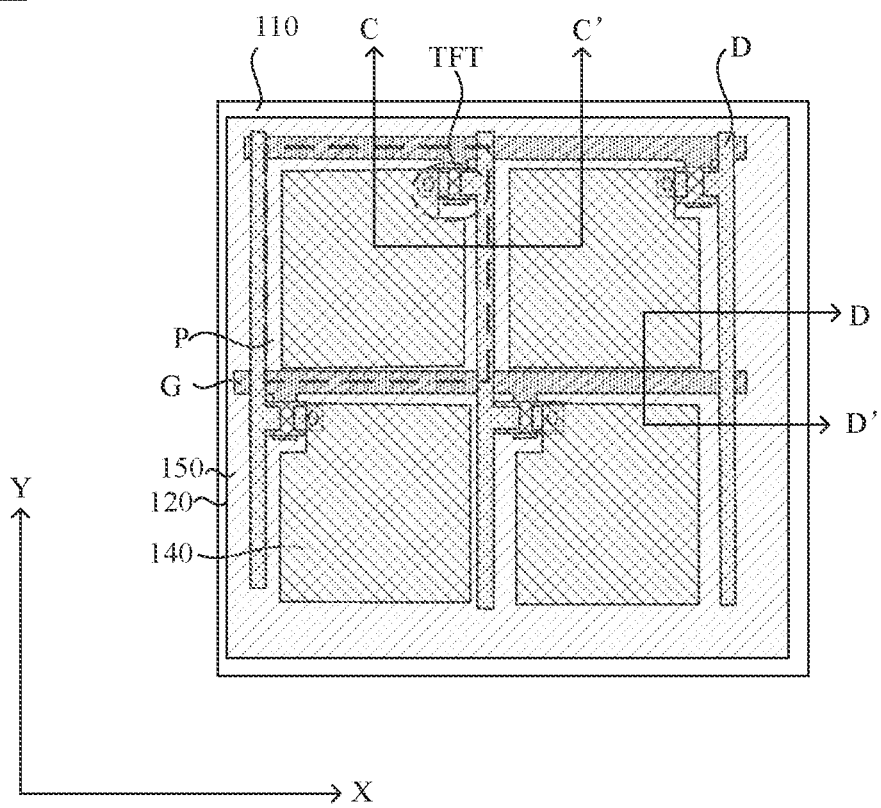
FIG. 3E is a structural diagram of yet another liquid crystal cell, in accordance with some embodiments of the present disclosure.
Figure 3F:
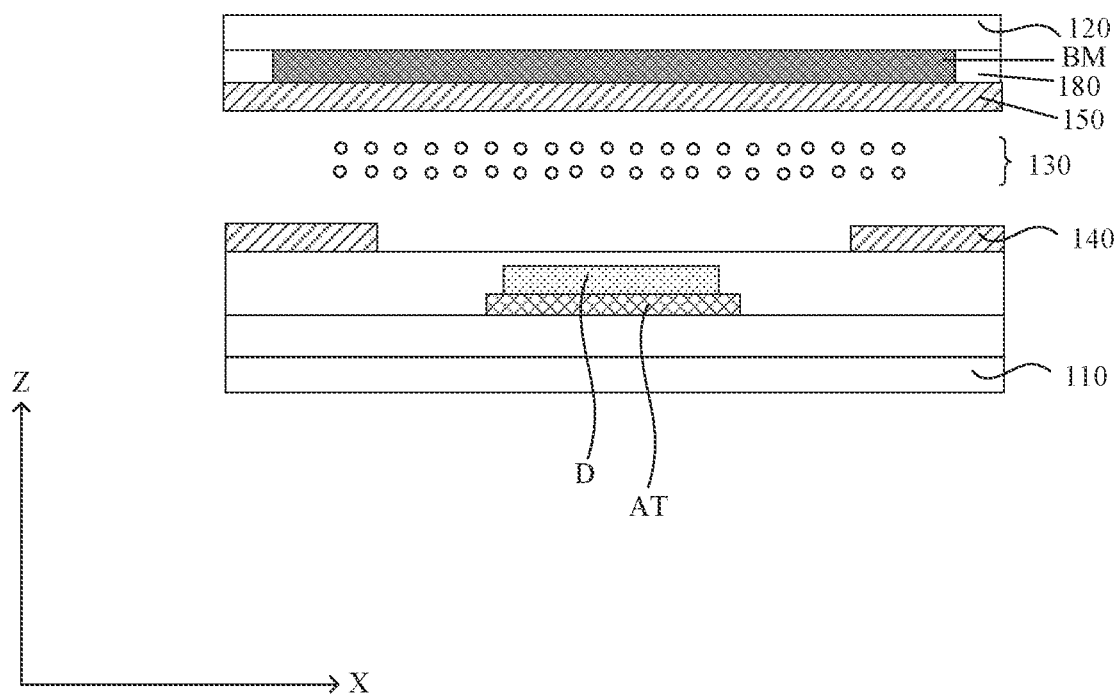
FIG. 3F is a sectional view of the liquid crystal cell in FIG. 3E taken along the line C-C'.
Figure 3G:
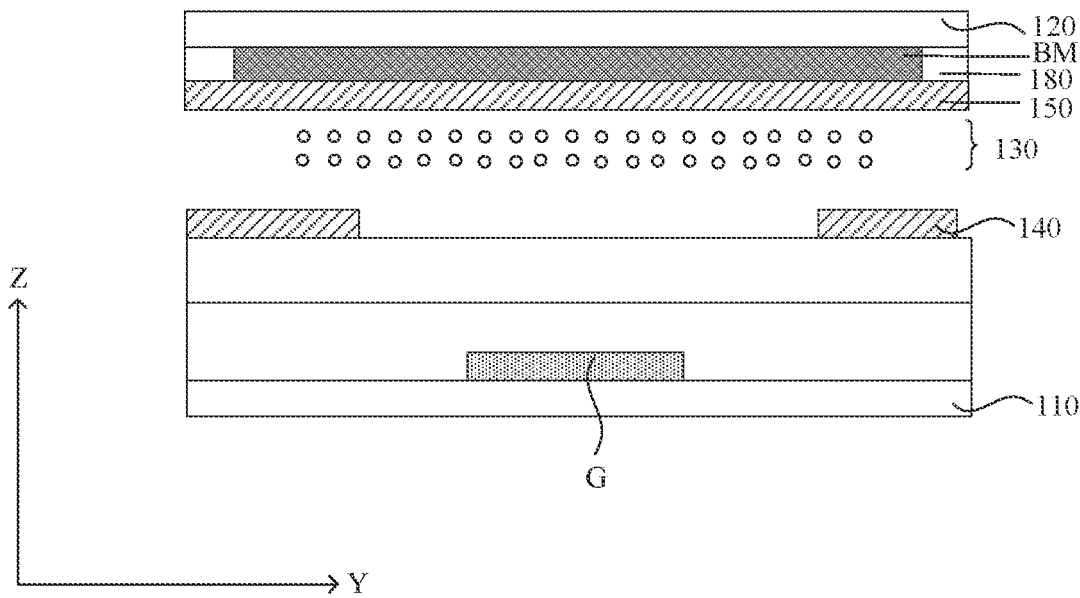
FIG. 3G is a sectional view of the liquid crystal cell in FIG. 3E taken along the line D-D'.

In some other embodiments, as shown in FIGS. 3E to 3G, the first electrode 140 is located on the first substrate 110, and the second electrode 150 is located on the second substrate 120. The first electrode 140 and the second electrode 150 are planar electrodes. For example, the second electrode 150 may cover an entire surface of the second substrate 120.

In addition, for example, as shown in FIG. 3A, the liquid crystal cell 10 further has a plurality of dummy sub-pixel areas Q, and the plurality of dummy sub-pixel areas Q are located outside the display area AA. For example, the dummy sub-pixel area Q has the same structure as the display sub-pixel area P. For example, the dummy sub-pixel area is provided with a TFT, a first electrode and a second electrode therein.

For example, the plurality of dummy sub-pixel areas Q and the plurality of display sub-pixel areas P are arranged in an array. Sub-pixel areas (e.g., including dummy sub-pixel area(s) Q and display sub-pixel areas P) arranged in a line in a direction X in FIG. 3A are referred to as a same row of sub-pixel areas. For example, TFTs in the same row of sub-pixel areas are coupled to a single gate line. For example, in dummy sub-pixel areas Q and display sub-pixel areas P in the same row of sub-pixel areas, TFTs are coupled to a single gate line. Sub-pixel areas arranged in a line in a direction Y in FIG. 3A are referred to as a same column of sub-pixel areas. For example, TFTs in adjacent two sub-pixel areas in the same column of sub-pixel areas including display sub-pixel areas P are respectively coupled to two data lines. For example, in dummy sub-pixel areas Q and display sub-pixel areas P in the same column of sub-pixel areas, TFTs in sub-pixel areas in odd-numbered rows are coupled to one data line, and TFTs in sub-pixel areas in even-numbered rows are coupled to another data line. For example, the common conductive pattern Vcom is coupled to TFTs in the dummy sub-pixels Q. For example, as shown in FIG. 3C, a semiconductor pattern AT is disposed on a surface of a data line D proximate to the first substrate 110, which may reduce a resistance of the data line and improve the signal transmission efficiency. The semiconductor pattern AT and an active layer of the TFT are arranged in a same layer and made of a same material. For example, the semiconductor pattern AT and the active layer of the TFT form a one-piece structure. Along a width direction of the data line D (e.g., the direction X in FIG. 3C), a width of the semiconductor pattern AT is greater than a width of the data line D.

In some embodiments, a display apparatus may provide a reflective layer, external light is used as a light source, the reflective layer reflects light, so that the reflective display of the display apparatus is realized. For example, the reflective layer (e. g., a metal reflective layer) may be disposed on a base substrate (e. g., a first substrate) where TFTs in a liquid crystal cell are located to reflect the light. However, this display apparatus has a low utilization rate of the light, a relatively poor light transmittance, a complex manufacturing process, a long development cycle, a poor process stability, and a large difference in performance of various products in mass production, and the display apparatus is mostly applied to a small sized display product.

In some embodiments, as shown in FIG. 2, the display panel 100 further includes an optical layer 20, a first polarization structure 30 and a second polarization structure 40.

The optical layer 20 is disposed on a side of the first substrate 110 in the liquid crystal cell 10 away from the second substrate 120. For example, the optical layer 20 is fully attached to a surface of the first substrate 110 in the liquid crystal cell 10 away from the second substrate 120. That is, the optical layer 20 is fully attached to an outer surface of the first substrate 110 in the liquid crystal cell 10. In other words, the optical layer is fully attached to an outer surface of the array substrate in the liquid crystal cell. For example, in the process, by using water-based adhesive or optically clear adhesive, the optical layer 20 and the liquid crystal cell 10 may be fully attached, so that there is no air between the optical layer 20 and the liquid crystal cell 10.

The optical layer 20 is configured to transmit part of light incident onto the optical layer 20 whose polarization direction is parallel to a transmission axis of the optical layer 20, and reflect a remaining part of the light incident onto the optical layer 20. For example, the remaining part of the light incident onto the optical layer 20 includes light with a polarization direction perpendicular to the transmission axis of the optical layer 20. For example, the transmission axis of the optical layer 20 is in a range of 0 degrees to 180 degrees (0° to 180°). For example, the transmission axis of the optical layer 20 is at 15°, 30° or 60°. In a case where the transmission axis of the optical layer 20 is at 0°, the part of the light incident onto the optical layer 20 whose polarization direction is parallel to the 0° transmission axis (e.g., light with a polarization direction of 0°) is transmitted by the optical layer 20, and the remaining part of the light incident onto the optical layer 20 (e.g., light with a polarization direction of 90°) is reflected by the optical layer 20. In a case where the transmission axis of the optical layer 20 is at 90°, the part of the light incident onto the optical layer 20 whose polarization direction is parallel to the 90° transmission axis (e.g., light with the polarization direction of 90°) is transmitted by the optical layer 20, and the remaining part of the light incident onto the optical layer 20 (e.g., light with the polarization direction of 0°) is reflected by the optical layer 20.

It will be noted that, the transmission axis herein may be set by considering a plane where the display panel is located as a reference. For example, the 0° transmission axis is parallel to the plane where the display panel is located, and the 90° transmission axis is parallel to the plane where the display panel is located, and the 0° transmission axis and the 90° transmission axis are perpendicular to each other in the plane where the display panel is located. The plane where the display panel is located may be a plane parallel to a display surface of the display panel. For example, the plane where the display panel is located may be parallel to a surface of the first substrate facing the liquid crystal layer.

The first polarization structure 30 is disposed on a side of the optical layer 20 away from the liquid crystal cell 10. For example, the optical layer 20 is located between the first polarization structure 30 and the liquid crystal cell 10. The second polarization structure 40 is disposed on a side of the liquid crystal cell 10 away from the optical layer 20. For example, the second polarization structure 40 is disposed on a side of the second substrate 120 in the liquid crystal cell 10 away from the first substrate 110.

For example, the first polarization structure 30 is fully attached to a surface of the optical layer 20 away from the liquid crystal cell 10, so that there is no air between the first polarization structure 30 and the optical layer 20. The second polarization structure 40 is fully attached to the surface of the liquid crystal cell 10 away from the optical layer 20. That is, the second polarization structure 40 is fully attached to the surface of the second substrate 120 away from the first substrate 110 (i.e., an outer surface of the second substrate 120). In other words, the second polarization structure 40 is fully attached to an outer surface of the opposite substrate of the liquid crystal cell 10. In this case, there is no air between the second polarization structure 40 and the liquid crystal cell 10.

The first polarization structure 30 is configured to transmit part of light incident onto the first polarization structure 30 whose polarization direction is parallel to a transmission axis of the first polarization structure 30, and absorb a remaining part of the light incident onto the first polarization structure 30. The second polarization structure 40 is configured to transmit part of light incident onto the second polarization structure 40 whose polarization direction is parallel to a transmission axis of the second polarization structure 40, and absorb a remaining part of the light incident onto the second polarization structure 40.

For example, the first polarization structure may be a component including a polarizer or a metal linear polarizer that can realize the above function, and the second polarization structure may adopt a component including a polarizer or a metal linear polarizer that can realize the above function.

The transmission axis of the first polarization structure 30 is perpendicular to the transmission axis of the optical layer 20. The transmission axis of the second polarization structure 40 is perpendicular to the transmission axis of the optical layer 20. The transmission axis of the first polarization structure 30 is parallel to the transmission axis of the second polarization structure 40. For example, in a case where the transmission axis of the optical layer 20 is at 0°, the transmission axis of the first polarization structure 30 is at 90°, and the transmission axis of the second polarization structure 40 is at 90°. For example, in a case where the transmission axis of the optical layer 20 is at 90°, the transmission axis of the first polarization structure 30 is at 0°, and the transmission axis of the second polarization structure 40 is at 0°.

Alternatively, the transmission axis of the second polarization structure 40 is parallel to the transmission axis of the optical layer 20. The transmission axis of the first polarization structure 30 is perpendicular to the transmission axis of the second polarization structure 40. For example, in a case where the transmission axis of the optical layer 20 is at 0°, the transmission axis of the first polarization structure 30 is at 90°, and the transmission axis of the second polarization structure 40 is at 0°. For example, in a case where the transmission axis of the optical layer 20 is at 90°, the transmission axis of the first polarization structure 30 is at 0°, and the transmission axis of the second polarization structure 40 is at 90°.

It will be noted that, the transmission axis of the first polarization structure 30, the transmission axis of the second polarization structure 40 and the transmission axis of the optical layer 20 are all parallel to the plane where the display panel 100 is located.

Figure 4:
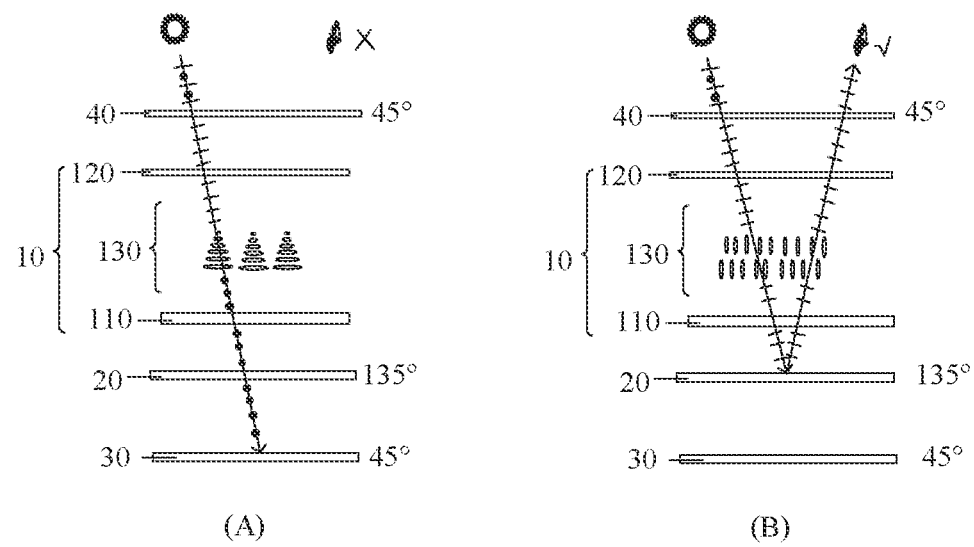
FIG. 4 is a light path diagram of a display panel, in accordance with some embodiments.

For example, referring to FIG. 4, in a case where the transmission axis of the optical layer 20 is at 135°, the transmission axis of the first polarization structure 30 is at 45°, and the transmission axis of the second polarization structure 40 is at 45°, after natural light incident from a side of the second polarization structure 40 away from the liquid crystal cell 10 passes through the second polarization structure 40, light with a polarization direction of 45° is obtained, and the light with the polarization direction of 45° enters the liquid crystal cell 10.

For example, the liquid crystal cell 130 is in a TN display mode. Referring to part (A) in FIG. 4, in a case where no electric field is applied to the liquid crystal molecules of the liquid crystal layer 130, the liquid crystal molecules of the liquid crystal layer 130 are arranged helically in sequence along a thickness direction of the liquid crystal cell 130, and have an optical rotation effect on light. When the light with the polarization direction of 45° enters the liquid crystal cell 10 and passes through the liquid crystal layer 130, the polarization direction of the light is changed, so that the linearly polarized light with the polarization direction of 45° becomes linearly polarized light with a polarization direction of 135°, and the linearly polarized light with the polarization direction of 135° is directed toward the optical layer 20. Since the transmission axis of the optical layer 20 is at 135°, the optical layer 20 transmits the linearly polarized light with the polarization direction of 135° to the first polarization structure 30. Since the polarization direction of the light transmitted by the optical layer 20 to the first polarization structure 30 is perpendicular to the transmission axis of the first polarization structure 30, the light transmitted by the optical layer 20 to the first polarization structure 30 is absorbed by the first polarization structure 30. Therefore, the display panel 100 is in a dark state, and no light enters human eyes.

Based on this, referring to part (B) in FIG. 4, when an electric field is applied to the liquid crystal molecules of the liquid crystal layer 130, a long axis direction of the liquid crystal molecules of the liquid crystal layer 130 tends to be parallel to a direction of the electric field due to the electric field. In this case, the polarized light incident onto the liquid crystal layer 130 propagates along the long axis direction of the liquid crystal molecules without birefringence, so that the liquid crystal layer 130 does not change the polarization direction of the incident light. Thus, when the light with the polarization direction of 45° enters the liquid crystal cell 10, the light maintains the polarization direction of 45° after passing through the liquid crystal layer 130. In this way, the polarization direction of the light emitted from the liquid crystal cell 10 toward the optical layer 20 is at 45°. Since the transmission axis of the optical layer 20 is at 135°, the light with the polarization direction of 45° incident onto the optical layer 20 is reflected toward the liquid crystal cell 10. In addition, after passing through the liquid crystal layer 130 in the liquid crystal cell 10, the light still maintains the polarization direction of 45° and is directed toward the second polarization structure 40, and the light exits from the side of the second polarization structure 40 away from the liquid crystal cell 10 and enters the human eyes. In this case, the ambient light incident on the display panel may be reflected for a normal display of the display panel, the display panel is in a bright state (white state), and the light enters the human eyes.

For example, the liquid crystal cell is in an ADS display mode. In a case where the transmission axis of the optical layer 20 is at 0°, the transmission axis of the first polarization structure 30 is at 90°, and the transmission axis of the second polarization structure 40 is at 0°, after the natural light is incident on the surface of the second polarization structure 40 away from the liquid crystal cell 10 and passes through the second polarization structure 40, light with a polarization direction of 0° is obtained, and the light with the polarization direction of 0° enters the liquid crystal cell 10. In a case where no electric field is applied to the liquid crystal molecules of the liquid crystal layer 130, the liquid crystal molecules of the liquid crystal layer 130 are not deflected, and the polarization direction of the incident light will not be changed. After the light with the polarization direction of 0° enters the liquid crystal cell 10 and passes through the liquid crystal layer 130, the light still maintains the polarization direction of 0°. In this way, the polarization direction of the light emitted from the liquid crystal cell 10 toward the optical layer 20 is at 0°. Since the transmission axis of the optical layer 20 is at 0°, the light with the polarization direction of 0° incident onto the optical layer 20 is transmitted to the first polarization structure 30, and is absorbed by the first polarization structure 30 with the transmission axis of 90°. In this case, the ambient light incident onto the display panel is not reflected, and the display panel does not display an image.

Based on this, when an electric field is applied to the liquid crystal molecules of the liquid crystal layer 130, the liquid crystal molecules are twisted, the light with the polarization direction of 0° after passing through the second polarization structure 40 passes through the liquid crystal layer 130, the linearly polarized light with the polarization direction of 0° becomes elliptically polarized light, and the elliptically polarized light is directed toward the optical layer 20. Since the transmission axis of the optical layer 20 is 0°, a part of light emitted from the liquid crystal cell 10 toward the optical layer 20 with a polarization direction of 0° is transmitted through the optical layer 20, and the remaining part of the light emitted from the liquid crystal cell 10 toward the optical layer 20 is reflected. The transmitted light is directed toward the first polarization structure 30. Since the transmission axis of the first polarization structure 30 is at 90°, the light with the polarization direction of 0° transmitted by the optical layer 20 is absorbed by the first polarization structure 30. The reflected light is incident onto the liquid crystal cell 10 to provide light required for the display of the display panel. In this case, the display panel may display an image.

Figure 5:
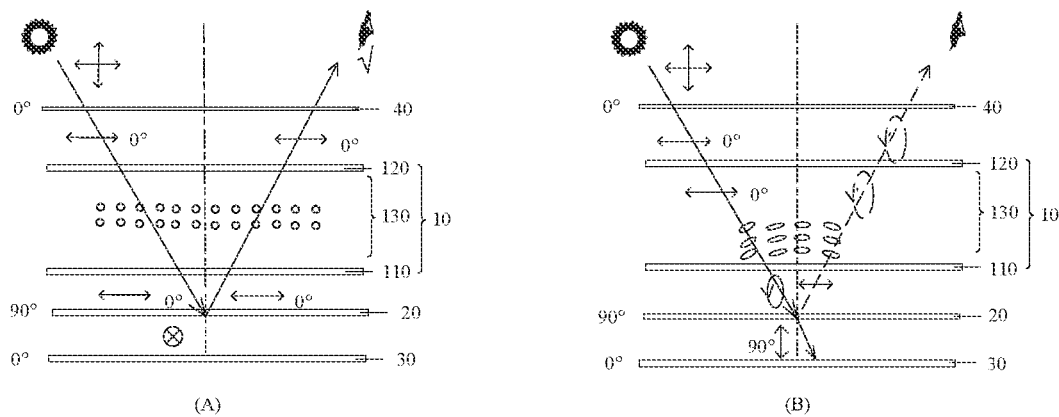
FIG. 5 is a light path diagram of a display panel, in accordance with some other embodiments.

For example, the liquid crystal cell is in the ADS display mode. Referring to FIG. 5, in a case where the transmission axis of the optical layer 20 is at 90°, the transmission axis of the first polarization structure 30 is at 0°, and the transmission axis of the second polarization structure 40 is at 0°, after the natural light is incident onto the surface of the second polarization structure 40 away from the liquid crystal cell 10 and passes through the second polarization structure 40, the light with the polarization direction of 0° is obtained, and the light with the polarization direction of 0° enters the liquid crystal cell 10.

For example, referring to part (A) in FIG. 5, an initial arrangement direction of the liquid crystal molecules are set according to the direction of the transmission axis of the second polarization structure 40. In a case where no electric field is applied to the liquid crystal molecules of the liquid crystal layer 130, the liquid crystal molecules of the liquid crystal layer 130 are not deflected, and the polarization direction of the incident light will not be changed. After the light with the polarization direction of 0° enters the liquid crystal cell 10 and passes through the liquid crystal layer 130, the light still maintains the polarization direction of 0°. In this way, the polarization direction of the light emitted from the liquid crystal cell 10 toward the optical layer 20 is at 0°. Since the transmission axis of the optical layer 20 is at 90°, the light with the polarization direction of 0° incident onto the optical layer 20 is reflected toward the liquid crystal cell 10. In addition, the light still maintains the polarization direction of 0° after passing through the liquid crystal layer 130 in the liquid crystal cell 10, and is incident onto the second polarization structure 40. Since the 0° polarization direction of the light is parallel to the transmission axis of the second polarization structure 40, the light exits from the side of the second polarization structure 40 away from the liquid crystal cell 10 and enters the human eyes. In this case, the ambient light incident onto the display panel may be reflected for the normal display of the display panel, and the display panel is in the bright state (white state). For example, the display mode of the display panel is a normally white mode.

Based on this, referring to part (B) in FIG. 5, the electric field is applied to the liquid crystal molecules of the liquid crystal layer 130, and the liquid crystal molecules of the liquid crystal layer 130 are twisted. That is, the polarization direction of the light passing through the liquid crystal layer 130 will be changed. For example, after the light with the polarization direction of 0° enters the liquid crystal cell 10 and passes through the liquid crystal layer 130, the polarization direction of the light changes, so that the linearly polarized light with the polarization direction of 0° becomes the elliptically polarized light, and the elliptically polarized light is directed toward the optical layer 20.

It will be noted that, in an actual situation, a large part of the light incident onto the liquid crystal layer will be twisted by the liquid crystal molecules, and a very little part of the light incident onto the liquid crystal layer will not be completely twisted by the liquid crystal molecules. For example, after the linearly polarized light with the polarization direction of 0° pass through the liquid crystal layer 130, a large part of the linearly polarized light becomes elliptically polarized light, and a very little part of the linearly polarized light are still linearly polarized light with the polarization direction of 0°.

Since the transmission axis of the optical layer 20 is at 90°, a part of the light emitted from the liquid crystal cell 10 toward the optical layer 20 with a polarization direction of 90° is transmitted by the optical layer 20, and a remaining part of the light emitted from the liquid crystal cell 10 toward the optical layer 20 is reflected. The transmitted light is directed toward the first polarization structure 30. Since the transmission axis of the first polarization structure 30 is at 0°, the first polarization structure 30 absorbs the light with the polarization direction of 90° transmitted by the optical layer 20. The reflected light is directed toward the liquid crystal cell 10, and a polarization direction thereof is approximately at 0°. After passing through the liquid crystal layer 130, the reflected light becomes elliptically polarized light, and the elliptically polarized light is incident onto the second polarization structure 40. The second polarization structure 40 transmits part of the elliptically polarized light with a polarization direction parallel to its transmission axis, and absorbs a remaining part of the elliptically polarized light. In this case, the ambient light incident onto the display panel is not reflected, and the display panel is in a dark state (black state).

It will be noted that, since the second polarization structure transmits a little amount of light, there may be a slight light leakage in the dark state of the display panel. However, since the slight light leakage has little influence on the viewing effect of the user, the slight light leakage can be ignored.

In this case, in a process in which the display panel is in the dark state, since the liquid crystal molecules of the liquid crystal layer in the liquid crystal cell have different transmittances to light of different wavelengths, linearly polarized light becomes elliptically polarized light after passing through the liquid crystal layer, and the elliptically polarized light may be resolved into linearly polarized light with different polarization directions after being incident onto the surface of the optical layer. Light with a polarization direction parallel to the transmission axis of the optical layer is transmitted to be incident onto the surface of the first polarization structure, and is absorbed by the first polarization structure. Therefore, a brightness of the display panel in the dark state is reduced, and the contrast ratio of the display panel is improved. In addition, in a process in which the display panel is in the bright state, after passing through the liquid crystal layer, linearly polarized light still maintains the original polarization direction and is incident onto the surface of the optical layer, and light with a polarization direction not parallel to the transmission axis of the optical layer is reflected. In this case, the linearly polarized light is reflected on the surface of the optical layer, is directed toward the liquid crystal cell, and exits from the liquid crystal cell to provide light required for display.

Therefore, for the display panel provided in the embodiments of the present disclosure, the ambient light passes through the second polarization structure in the display panel to obtain the linearly polarized light. After passing through the liquid crystal cell, the linearly polarized light is incident onto the optical layer. The optical layer transmits the part of the light incident onto the optical layer whose polarization direction is parallel to the transmission axis of the optical layer, and reflects the remaining part of the light incident onto the optical layer (i.e., light with polarization directions not parallel to the transmission axis of the optical layer). Light transmitted by the optical layer is incident onto the surface of the first polarizer and absorbed by the first polarizer, and the display panel is in the dark state at this time. Light reflected by the optical layer is incident onto the liquid crystal cell and exits from the liquid crystal cell, and the display panel is in the bright state at this time. In this way, a reflectivity of the light may be improved in the bright state; and the light is absorbed by the first polarizer in the dark state, which may prevent the light from being reflected. Compared with the display apparatus provided with the reflective layer, in the embodiments of the present disclosure, the brightness of the display panel in the dark state is reduced, thereby improving the contrast ratio of the display panel.

Figure 6A:
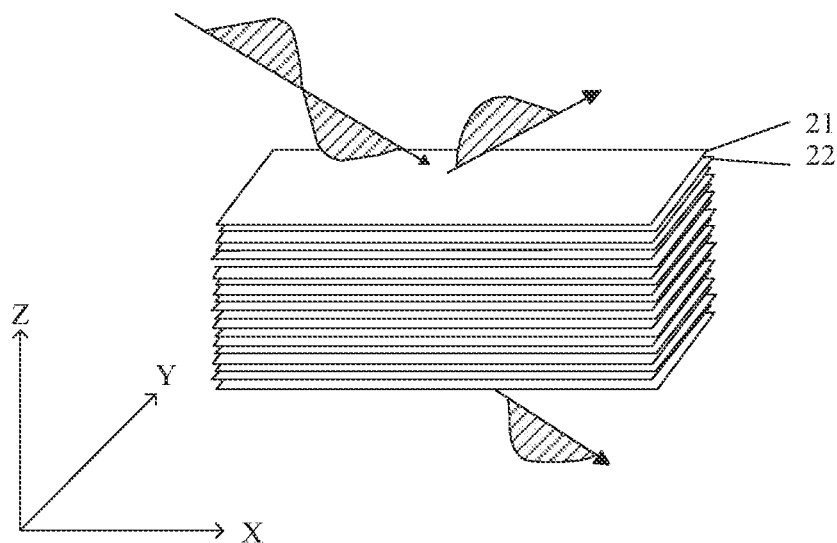
FIG. 6A is a structural diagram of an optical layer, in accordance with some embodiments of the present disclosure.

In some embodiments, as shown in FIG. 6A, the optical layer 20 includes a plurality of first optical films 21 and a plurality of second optical films 22. In a direction perpendicular to the plane where the display panel 100 is located (e. g., referring to a direction Z in FIG. 2), the first optical films 21 and the second optical films 22 are alternately stacked. A second optical film 22 may be located between adjacent two first optical films 21, and a first optical film 21 may be located between adjacent two second optical films 22. For example, in the direction perpendicular to the plane where the display panel 100 is located (e. g., referring to the direction Z in FIG. 2), or in a thickness direction of the optical layer 20 (a direction perpendicular to a plane where the optical layer 20 is located, i.e., the direction Z in FIG. 6A), the plurality of (e. g., dozens, hundreds, thousands or tens of thousands of) the first optical films 21 and the plurality of second optical films 22 are alternately stacked. For example, the thickness of the optical layer 20 is in a range of 150 μm to 300 μm, inclusive. For example, the thickness of the optical layer 20 is 175 μm, 200 μm, or 250 μm.

The plurality of first optical films 21 are birefringent, and the plurality of second optical films 22 are single refractive. That is, the plurality of first optical films 21 are anisotropic, and the plurality of second optical films 22 are isotropic. For example, the first optical film 21 has two refractive indices, and the second optical film 22 has a single refractive index.

Figure 6B:
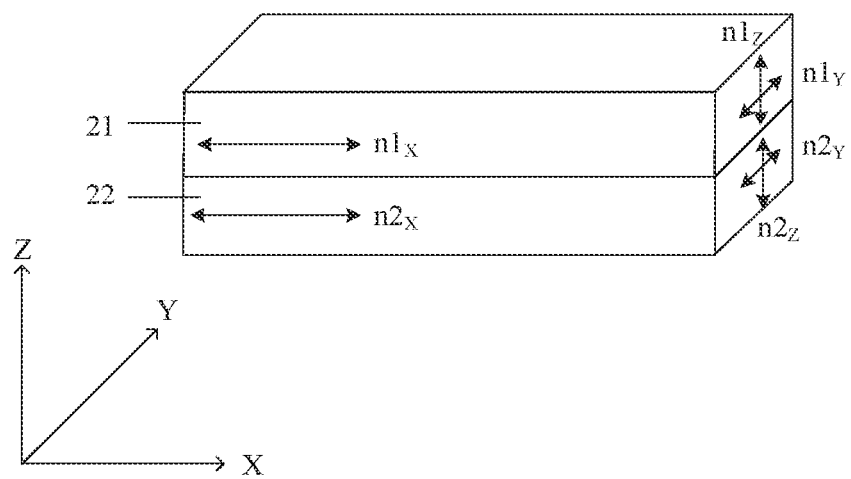
FIG. 6B is a structural diagram of another optical layer, in accordance with some embodiments of the present disclosure.

For example, as shown in FIG. 6B, in a first direction (e. g., a direction X in FIG. 6B) in the plane where the optical layer 20 is located, a refractive index $n1_X$ of the first optical film 21 is greater than a refractive index $n2_X$ of the second optical film 22. For example, in the first direction in the plane where the optical layer 20 is located, the refractive index of the first optical film 21 is about 1.8, and the refractive index of the second optical film 22 is about 1.57. In a second direction (e. g., a direction Y in FIG. 6B) in the plane where the optical layer 20 is located, a refractive index $n1_Y$ of the first optical film 21 is equal to a refractive index $n2_Y$ of the second optical film 22. For example, in the second direction in the plane where the optical layer 20 is located, both the refractive index of the first optical film 21 and the refractive index of the second optical film 22 are about 1.57. The first direction is perpendicular to the second direction.

It may be understood that, a directional total reflection phenomenon occurs at an interface between the first optical film 21 and the second optical film 22. That is, at the interface between the first optical film 21 and the second optical film 22, light with a polarization direction (a vibration direction) parallel to the first direction is reflected, and light with a polarization direction (a vibration direction) parallel to the second direction is transmitted. In this way, after a beam of light passes through a plurality of interfaces, the beam of light is resolved into two beams of polarized light whose polarization directions are perpendicular to each other. One beam of polarized light with a polarization direction parallel to the first direction is reflected, and the other beam of polarized light with a polarization direction parallel to the second direction is transmitted. In this case, when the light (e.g., linearly polarized light) with the polarization direction parallel to the first direction is incident onto the surface of the optical layer 20, most of the light will remain its original polarization direction and be reflected; and when the light (e.g., linearly polarized light) with the polarization direction parallel to the second direction is incident onto the surface of the optical layer 20, most of the light will remain its original polarization direction and be transmitted.

In addition, in a third direction (e. g., the direction Z in FIG. 6B) in the plane where the optical layer 20 is located, a refractive index of the first optical film 21 is equal to a refractive index of the second optical film 22. For example, in the third direction in the plane where the optical layer 20 is located, the refractive index $n1_z$ of the first optical film 21 and the refractive index $n2_z$ of the second optical film 22 are about 1.57. The plane where the optical layer 20 is located is a plane determined by the first direction and the second direction. The third direction is perpendicular to the first direction and the second direction.

It will be noted that thicknesses of the first optical film 21 and the second optical film 22 are small. In this case, light reflected on the interfaces between the plurality of first optical films 21 and the plurality of second optical films 22 undergoes constructive interference or destructive interference, so that the optical layer 20 has corresponding reflective or transmission properties.

One of a first optical film 21 and a second optical film 22 is directly bonded (or attached) to the first polarization structure 30. For example, for the optical layer 20, an outer surface of the outermost film (e.g., the first optical film 21 or the second optical film 22) of the plurality of first optical films 21 and the plurality of second optical films 22 that are stacked is not covered by other film layers (e.g. a coating including an optical scattering layer, an ultraviolet light absorption layer, a scratch-resistant coating or a tear-resistant layer). There is also no other film layer (e.g., a protective layer) provided between adjacent first optical film 21 and second optical film 22. In this way, it is possible to avoid a problem that light is scattered by particles (e. g., scattering particles) on surfaces of other film layers when passing through the film layers, which results in reduction in the transmittance and reflectivity, and reduction in the contrast ratio of the display panel.

Figure 7A:
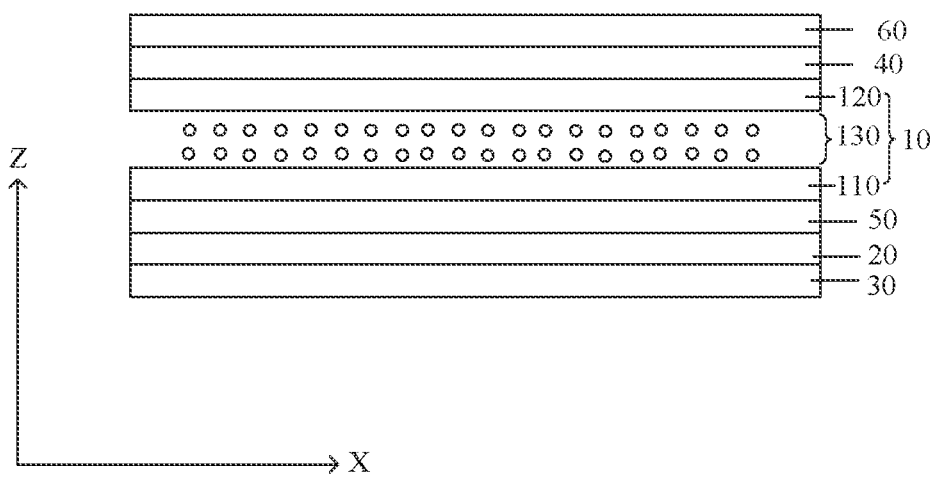
FIG. 7A is a structural diagram of another display panel, in accordance with some embodiments.
Figure 7B:
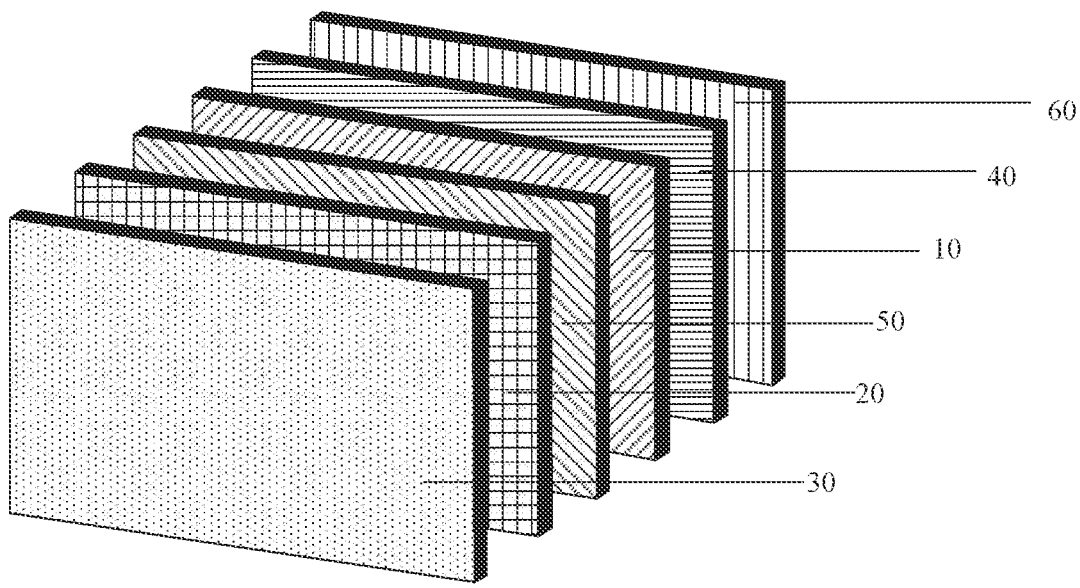
FIG. 7B is an exploded diagram of the display panel in FIG. 7A.

In some embodiments, as shown in FIGS. 7A and 7B, the display panel 100 further includes a scattering film 50. The scattering film 50 is disposed on a side of the liquid crystal cell 10 proximate to the optical layer 20. That is, the scattering film 50 is located between the liquid crystal cell 10 and the optical layer 20. For example, the scattering film 50 is fully attached to the surface of the liquid crystal cell 10 proximate to the optical layer 20. That is, the scattering film 50 is fully attached to the outer surface of the first substrate 110 of the liquid crystal cell 10. In other words, the scattering film 50 is fully attached to the outer surface of the array substrate of the liquid crystal cell 10. In this way, there is no air between the scattering film 50 and the liquid crystal cell 10, so that a loss of light in the propagation process may be reduced. For example, the optical layer 20 is fully attached to the surface of the scattering film 50 away from the liquid crystal cell 10; or, a border of the optical layer 20 is attached to the surface of the scattering film 50 away from the liquid crystal cell 10.

For example, referring to FIG. 6A, the optical layer 20 includes the plurality of first optical films 21 and the plurality of second optical films 22, and one of the first optical film 21 and the second optical film 22 is directly bonded (or attached) to the scattering film 50. Therefore, for the optical layer 20, there is no other film layers provided on an outer surface of an outermost film (e.g., the first optical film 21, the second optical film 22 or the scattering film 50) of the optical layer 20, and light interference may be avoid.

Figure 8A:
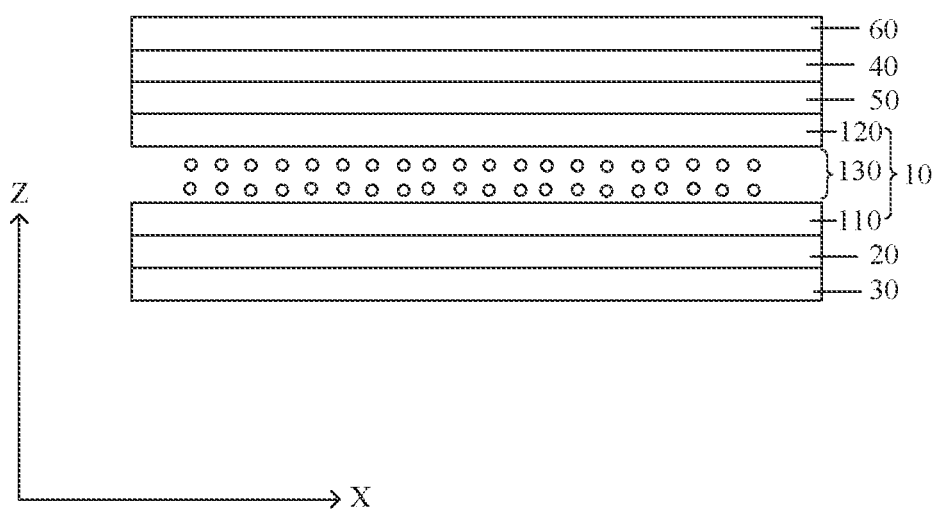
FIG. 8A is a structural diagram of another display panel, in accordance with some embodiments.
Figure 8B:
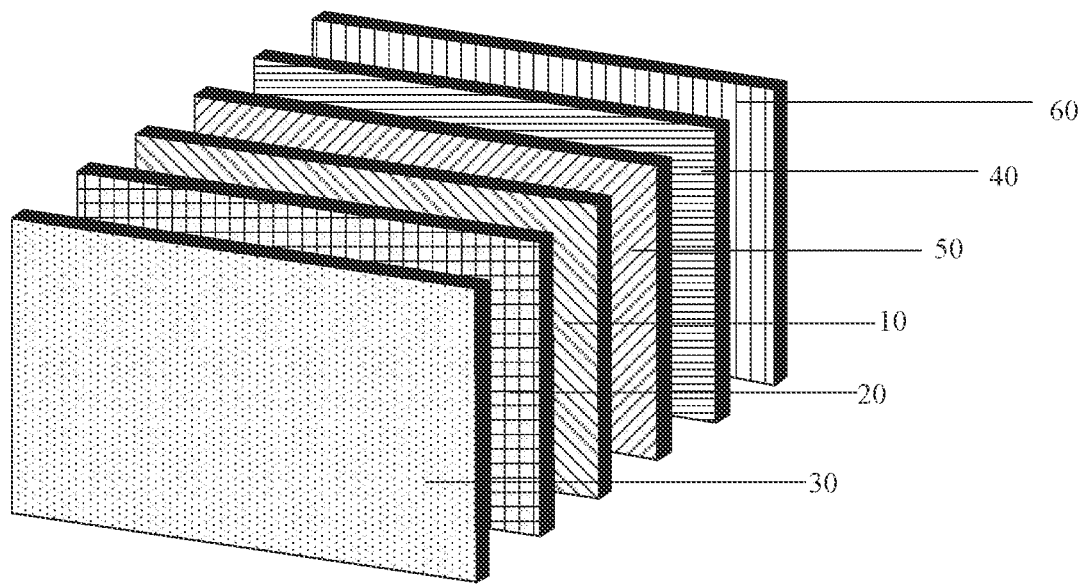
FIG. 8B is an exploded diagram of the display panel in FIG. 8A.

In some other embodiments, as shown in FIGS. 8A and 8B, the scattering film 50 is disposed on a side of the liquid crystal cell 10 away from the optical layer 20. That is, the scattering film 50 is located between the liquid crystal cell 10 and the second polarizer structure 40. For example, the scattering film 50 is fully attached to the surface of the liquid crystal cell 10 away from the optical layer 20. That is, the scattering film 50 is fully attached to the outer surface of the second substrate 110 of the liquid crystal cell 10. In other words, the scattering film 50 is fully attached to the outer surface of the opposite substrate of the liquid crystal cell 10. In this way, there is no air between the scattering film 50 and the liquid crystal cell 10, so that the loss of light in the propagation process may be reduced. For example, the second polarization structure 40 is fully attached to the surface of the scattering film 50 away from the liquid crystal cell 10.

It may be understood that, the scattering film 50 may adjust a propagation direction of light passing through the scattering film 50, and change a propagation angle of the light, thereby improving the reflectivity of the display panel, improving the viewing angle of the display panel, and improving the contrast ratio of the display panel. For example, in a case where the display panel 100 performs black and white display, the reflectivity of the display panel 100 in FIGS. 7A and 7B may reach 41%, and the contrast ratio may reach 5:1.

Figure 9A:
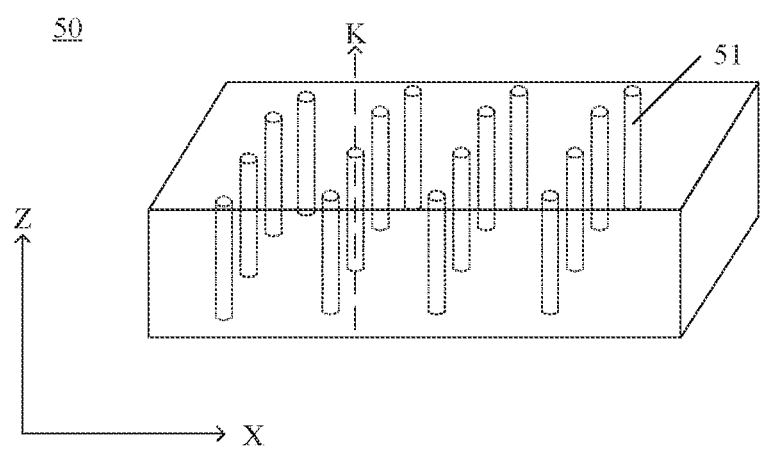
FIG. 9A is a structural diagram of a scattering film, in accordance with some embodiments of the present disclosure.
Figure 9B:
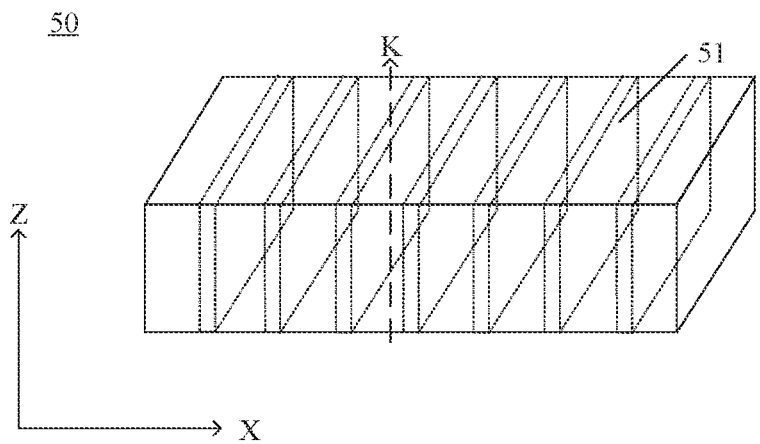
FIG. 9B is a structural diagram of another scattering film, in accordance with some embodiments of the present disclosure.

For example, the scattering film 50 is anisotropic. As shown in FIGS. 9A and 9B, the scattering film 50 includes a plurality of scattering structures 51. It will be noted that, the embodiments of the present disclosure do not limit the shape and an inclination angle of the scattering structure 51 in the scattering film 50, which may be designed according to actual situations. For example, the plurality of scattering structures 51 have a column shape or a plate shape. For example, there is an included angle between a side surface of the scattering structure 51 and a direction perpendicular to a plane where the scattering film 50 is located (e.g., the direction Z in FIGS. 9A and 9B), or the side surface of the scattering structure 51 is parallel to the direction perpendicular to the plane where the scattering film 50 is located. The scattering structure 51 has a top surface, a bottom surface and the side surface, the top surface and the bottom surface of the scattering structure are opposite to each other in the direction perpendicular to the plane where the scattering film is located, and the side surface of the scattering structure is located between the top surface and the bottom surface.

Figure 9C:
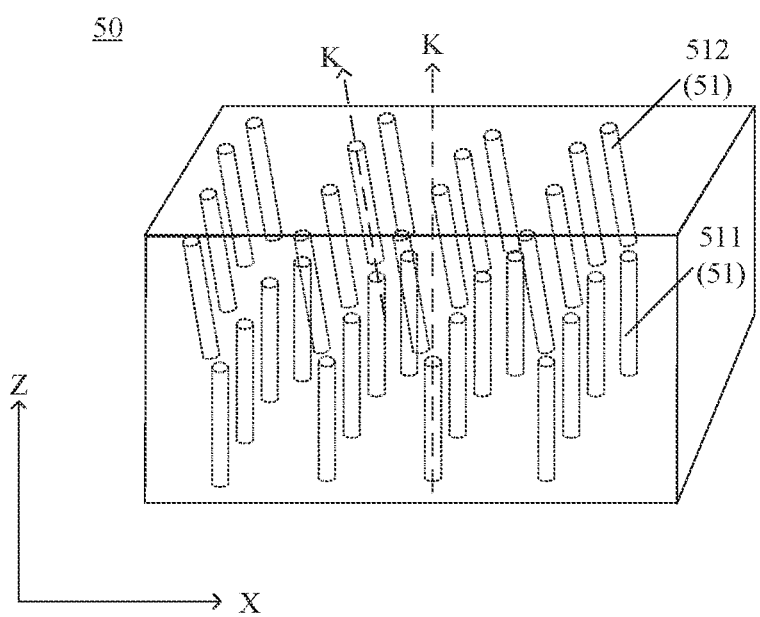
FIG. 9C is a structural diagram of yet another scattering film, in accordance with some embodiments of the present disclosure.

For example, as shown in FIG. 9C, the plurality of scattering structures 51 include a first scattering structure 511 and a second scattering structure 512. The first scattering structure 511 and the second scattering structure 512 are stacked in the direction perpendicular to the plane where the scattering film 50 is located. For example, in the direction perpendicular to the plane where the scattering film 50 is located, the bottom surface of the second scattering structure 512 and the top surface of the first scattering structure 511 are disposed proximate to each other. For example, the bottom surface of the second scattering structure 512 is in contact with the top surface of the first scattering structure 511. For example, the second scattering structure 512 is not aligned with the first scattering structure 511 in the direction perpendicular to the plane where the scattering film 50. For example, the side surface of the first scattering structure 511 may be parallel to the direction perpendicular to the plane where the scattering film 50 is located, and there is an included angle between the side surface of the second scattering structure 512 and the direction perpendicular to the plane where the scattering film 50 is located. Alternatively, for example, there is an included angle between the side surface of the first scattering structure 511 and the direction perpendicular to the plane where the scattering film 50 is located, and there is an included angle between the second scattering structure 512 and the direction perpendicular to the plane where the scattering film 50 is located.

The scattering film 50 has a scattering axis. For example, an included angle between the scattering axis and the direction perpendicular to the plane where the display panel 100 is located is in a range of 0° to 75°, inclusive. For example, the included angle between the scattering axis and the direction perpendicular to the plane where the display panel 100 is located is in a range of 0° to 45°, inclusive. For example, the included angle between the scattering axis and the direction perpendicular to the plane where the display panel 100 is located is 30°, 45°, 55° or 60°. The scattering film 50 is configured such that an intensity of light transmitted by the scattering film 50 is maximized when the light is incident onto the scattering film 50 in a direction parallel to the scattering axis. For example, referring to FIGS. 9A to 9C, the scattering axis K of the scattering film 50 may be in a range of 0° to 90°, inclusive. For example, the scattering axis of the scattering film 50 may be in a range of 0° to 10°, inclusive; or the scattering axis of the scattering film 50 may be in a range of 0° to 45°, inclusive. For example, the scattering axis may be 5°, 10° or 15°. The scattering axis K of the scattering film 50 is an included angle between a beam of light with the maximum light intensity of light passing through the scattering film 50 and the direction perpendicular to the plane where the scattering film 50 is located. For example, the scattering axis K of the scattering film 50 is an included angle between the light passing through the scattering film 50 and the direction (referring to the direction Z in FIGS. 9A to 9C) perpendicular to the plane where the display panel 100 is located. A part of the light transmitted by the scattering film 50 propagating in a direction of the scattering axis has the maximum intensity. For example, in a case where the scattering axis of the scattering film 50 is at 0°, a part of the light passing through the scattering film 50 that is transmitted in the direction of the scattering axis of 0° has the maximum intensity. That is, light transmitted in a direction at an included angle of 0° from the direction perpendicular to the plane where the scattering film 50 is located has the maximum intensity. For example, in a case where the scattering axis of the scattering film 50 is at 10°, a part of the light passing through the scattering film 50 that is transmitted in the direction of the scattering axis of 10° has the maximum intensity. That is, light transmitted in a direction at an included angle of 10° from the direction perpendicular to the plane where the scattering film 50 is located has the maximum intensity.

For example, in the display apparatus 200, in the direction of the scattering axis of the scattering film 50, the reflectivity of light is the largest; and the reflected light in the direction of the scattering axis of the scattering film 50 has the maximum intensity.

Figure 9D:
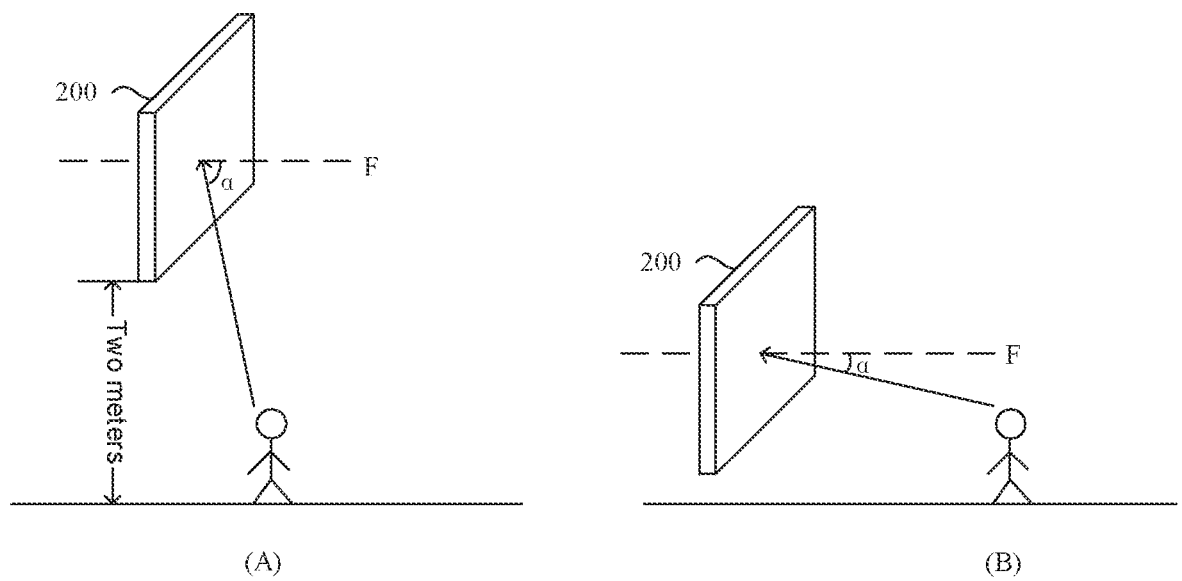
FIG. 9D is a schematic diagram showing an application scenario of a display apparatus, in accordance with some embodiments.

It will be noted that, the bonding manner of the scattering film in the display apparatus may be adjusted according to the actual situations (e.g., different usage scenarios of the display apparatus or a sight line of the user), which is not limited herein. For example, referring to part (A) in FIG. 9D, in a case where the display apparatus 200 is used for outdoor display (for example, the display apparatus 200 is placed at two meters from the ground plane), a direction of the sight line of the user and a direction of a normal F of the display surface of the display apparatus 200 are approximately perpendicular to each other (for example, an included angle α provided therebetween is greater than or equal to 75°), and the scattering film may be bonded to make the scattering axis of the scattering film be perpendicular to the normal direction of the display surface of the display apparatus. For example, referring to part (B) in FIG. 9D, in a case where the direction of the sight line of the user and the direction of the normal of the display surface of the display apparatus 200 are approximately parallel to each other (for example, the included angle α is less than or equal to 15°), the scattering film may be bonded to make the scattering axis of the scattering film be parallel to the normal direction of the display surface of the display apparatus. Therefore, in the direction of the sight line of the user, the reflectivity of light is large, and the display effect is improved.

Figure 11:
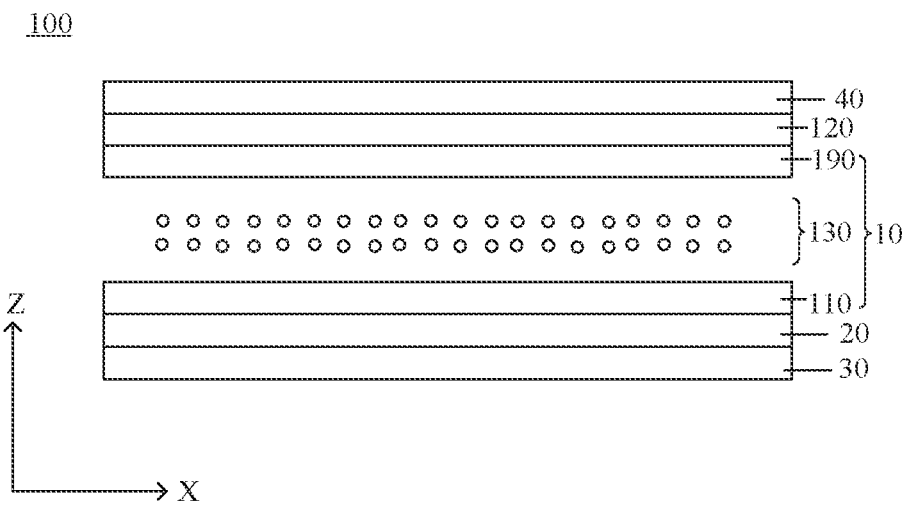
FIG. 11 is a structural diagram of yet another display panel, in accordance with some embodiments.

For example, as shown in FIG. 11, the liquid crystal cell 10 further includes an electrostatic shielding pattern 190 disposed on the second substrate 120 and located on a side of the second substrate 120 proximate to the liquid crystal layer 130. For example, in a case where a filter layer is provided on the second substrate of the liquid crystal layer, the electrostatic shielding pattern is closer to the liquid crystal layer than the filter layer. The electrostatic shielding pattern 190 is made of a transparent conductive material, such as ITO. In this way, reduction of the display effect due to electrostatic charges in the liquid crystal cell may be avoided. For example, since refractive indices of conductive structures (e.g., the transparent conductive structures such as the first electrode, the second electrode, and the electrostatic shielding pattern) in the liquid crystal cell are large (for example, the refractive index of ITO is in a range of 1.8 to 2.1, inclusive), light is reflected (e.g., specular reflected) on the surface of the conductive structure.

Figure 10:
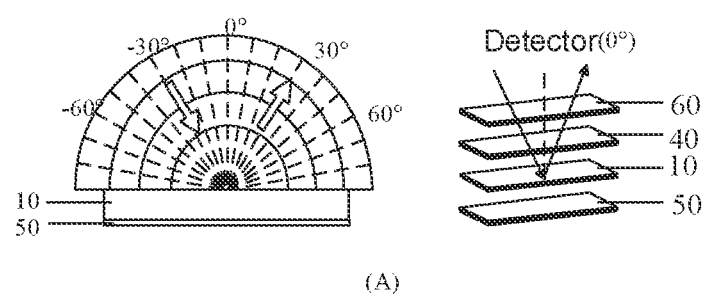
FIG. 10 is a schematic diagram showing a detection process of reflected light of a display panel, in accordance with some embodiments.
Figure 10:
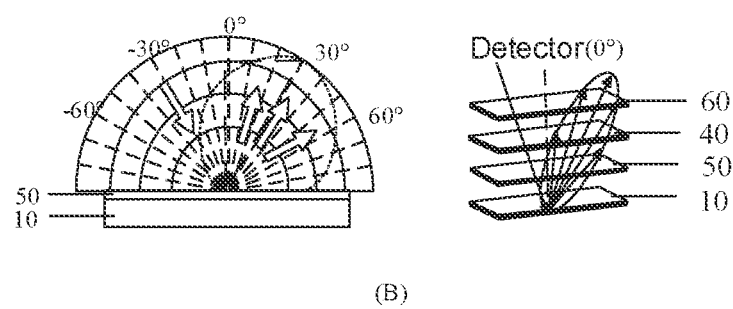

For example, referring to FIG. 7A, the scattering film 50 is located on the side of the liquid crystal cell 10 proximate to the optical layer 20, and the light reflected on the conductive structures in the liquid crystal cell 10 does not pass through the scattering film 50. In this case, the light is reflected on the conductive structures in the liquid crystal cell 10. In an actual test process, as shown in part (A) of FIG. 10, in a case where an incident angle of test light on the surface of the conductive structure is not 0°, most of the test light will be reflected at the same angle as the incident angle. In this case, a detector located in the normal direction of a plane where the conductive structure is located (that is, the detector for detecting reflected light with an included angle of 0° to the normal direction of the plane where the conductive structure is located) cannot detect light reflected on the surface of the conductive structure.

For example, referring to FIG. 8A, the scattering film 50 is located on the side of the liquid crystal cell 10 away from the optical layer 20, and the light reflected on the conductive structure in the liquid crystal cell 10 passes through the scattering film 50. That is, the scattering film 50 scatters the reflected light, and the scattered light will propagate in a plurality of directions, resulting in a reflected light distribution similar to a diffuse reflection. In the actual test process, as shown in part (B) of FIG. 10, in a case where the incident angle of the test light on the surface of the conductive structure is not 0°, the detector located in the normal direction of the plane where the conductive structure is located (that is, the detector for detecting the reflected light with the included angle of 0° to the normal direction of the plane where the conductive structure is located) may detect the light reflected on the surface of the conductive structure. In this way, the viewing angle of the light emitted from the display panel is enlarged.

In this case, the detector may detect the reflected light from the surface of the conductive structure when the display panel (e.g., the display panel 100 in FIGS. 8A and 8B) is in the dark state or the bright state, so that the reflectivity of the display panel is improved in the dark state or the bright state.

In this way, the contrast ratio CR is equal to R1 divided by R2 (CR=R1/R2), R1 is the reflectivity of the display panel in the bright state, and R2 is the reflectivity of the display panel in the dark state. For example, the display grayscale is in a range of 0 to 255 inclusive, the reflectivity of the display panel in the bright state is the reflectivity of the display panel when the grayscale is 255, and the reflectivity of the display panel in the dark state is the reflectivity of the display panel when the grayscale is 0. The reflectivity of the display panel 100 in FIGS. 8A and 8B is greater than the reflectivity of the display panel 100 in FIGS. 7A and 7B. A difference between the reflectivity of the display panel 100 in FIGS. 7A and 7B in the bright state and the reflectivity of the display panel 100 in FIGS. 8A and 8B in the bright state is small, and the reflectivity of the display panel 100 in FIGS. 8A and 8B in the dark state is greater than the reflectivity of the display panel 100 in FIGS. 7A and 7B in the dark state (that is, a display image of the display panel 100 in FIGS. 7A and 7B in the dark state is darker than a display image of the display panel 100 in FIGS. 8A and 8B in the dark state), so that the contrast ratio of the display panel 100 in FIGS. 7A and 7B is greater than the contrast ratio of the display panel 100 in FIGS. 8A and 8B. In this way, for the display panel 100 in FIGS. 8A and 8B, if the reflectivity of the display panel 100 in the dark state is high, the contrast ratio of the display panel 100 will be low. For the display panel 100 in FIGS. 7A and 7B, if the reflectivity of the display panel 100 in the dark state is low, the contrast ratio of the display panel 100 will be high.

In some embodiments, as shown in FIGS. 7A to 7B, 8A and 8B, the display panel 100 further includes an anti-reflection film 60. The anti-reflection film 60 is disposed on a side of the second polarization structure 40 away from the optical layer 20. For example, the anti-reflection film 60 is fully attached to a surface of the second polarization structure 40 away from the optical layer 20 (i.e., away from the liquid crystal cell 10).

It may be understood that, the anti-reflection film 60 has an anti-reflection effect on the light incident on the display panel, which causes more light to pass through the anti-reflection film 60, thereby reducing the light loss, and improving the transmittance of the light.

It will be noted that, the anti-reflection film may be designed according to the actual situations, which is not limited herein. For example, the anti-reflection film 60 may be a single-layer structure, a double-layer structure, a triple-layer structure or a multi-layer structure.

Figure 12:
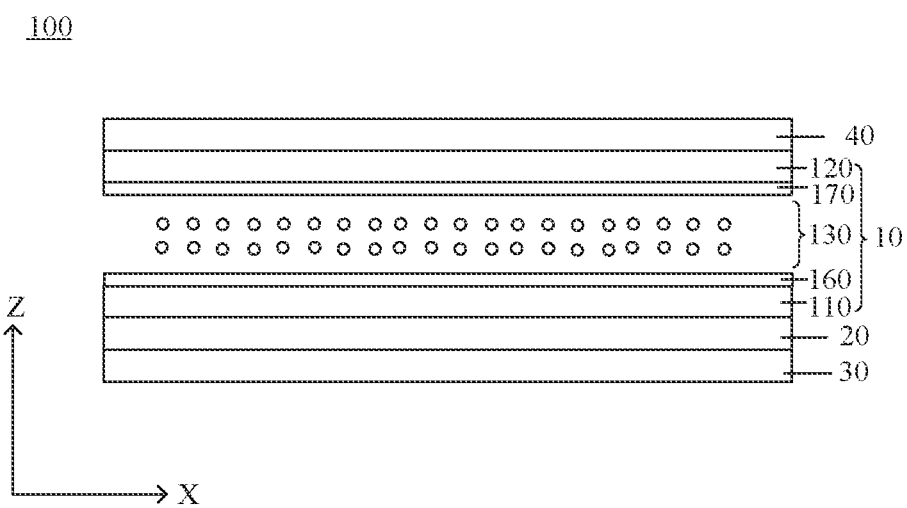
FIG. 12 is a structural diagram of yet another display panel, in accordance with some embodiments.

In some embodiments, as shown in FIG. 12, the liquid crystal cell 10 further includes a first alignment layer 160 and a second alignment layer 170. The first alignment layer 160 is disposed on the first substrate 110 and on a side of the first substrate 110 proximate to the liquid crystal layer 130, and the second alignment layer 170 is disposed on the second substrate 120 and on a side of the second substrate 120 proximate to the liquid crystal layer 130. The first alignment layer 160 has a first alignment direction, and the second alignment layer 170 has a second alignment direction.

For example, the first alignment direction and the second alignment direction may be rubbing directions in the process of forming the alignment layers by a rubbing process.

It will be noted that, the first alignment direction and the second alignment direction may be designed according to actual needs.

For example, the first alignment direction is parallel to the second alignment direction, and the second alignment direction is perpendicular to the transmission axis of the second polarization structure 40. For example, the transmission axis of the second polarization structure 40 is at 90°, and both the first alignment direction and the second alignment direction are at 0°. Alternatively, for example, both the first alignment direction and the second alignment direction are at 90°, and the transmission axis of the second polarization structure 40 is at 0°. For example, the liquid crystal cell 10 may be applied to the ADS display panel.

Alternatively, for example, the first alignment direction is perpendicular to the second alignment direction, and the second alignment direction is parallel to the transmission axis of the second polarization structure. For example, the first alignment direction is at 135°, the second alignment direction is at 45°, and the transmission axis of the second polarization structure 40 is at 45°. In this case, the second electrodes are disposed on the second substrate, and the first electrodes and the second electrodes are planar electrodes. For example, the liquid crystal cell 10 may be applied to the TN display panel.

It will be noted that, any direction in the plane where the display panel is located may be used as a reference direction of the alignment direction. For example, an extension direction of the gate lines may be used as an alignment direction of 0°.

In some embodiments, referring to FIGS. 3C and 3D, the liquid crystal cell 10 further includes a plurality of filter layers 180. The plurality of filter layers 180 are disposed on the second substrate 120 and on the side of the second substrate 120 proximate to the liquid crystal layer 130. For example, the plurality of filter layers 180 are arranged in a same layer. For example, thicknesses of the plurality of filter layers 180 are each in a range of 0.3 μm to 3 μm, inclusive. For example, the thicknesses of the plurality of filter layers 180 are each in a range of 1 μm to 2.35 μm, inclusive. For example, the thicknesses of the plurality of filter layers 180 may be 1 μm, 1.8 μm, 2.1 μm, 2.3 μm or 2.35 μm.

The plurality of filter layers 180 include first filter layers, second filter layers, and third filter layers. A color of light passing through the first filter layer is a first color, a color of light passing through the second filter layer is a second color, and a color of light passing through the third filter layer is a third color. The first color, the second color and the third color are three primary colors. For example, the first color, the second color and the third color are red, green and blue, respectively.

For example, referring to FIGS. 3C and 3D, the liquid crystal cell 10 further includes a black matrix (BM) disposed on the second substrate 120.

For example, the thickness of the filter layer 180 is large, which leads to certain influence on the reflectivity of light. In some embodiments, a reflectivity (e. g., about 38.1%) of a black and white display panel (e. g., the display panel 100 in FIGS. 8A to 8B) is greater than a reflectivity (e. g., about 4.5%) of a color display panel (e. g., the display panel 100 in FIGS. 7A to 7B). A contrast ratio (e. g., about 9.5:1) of the black and white display panel is greater than a contrast ratio (e. g., about 7.2:1) of the color display panel. A color gamut of the color display panel is about 35%.

TABLE 1

| Size of display panel | Thickness of filter layer | Color gamut | Reflectivity | Contrast ratio |
|---|---|---|---|---|
| 19 inches | 2.75 μm | 34.4% | 3.9% | 6.4 |
|  | 1.07 μm | 25.0% | 8.0% | 7.7 |
|  | 0.82 μm | 20.0% | 9.7% | 7.9 |
|  | 0.63 μm | 15.0% | 11.7% | 8.2 |
|  | 0.47 μm | 10.0% | 14.4% | 8.4 |
| 43 inches | 2 μm | 7.9% | 2.2% | 19.4 |
|  | 1.5 μm | 6.5% | 3.5% | 22.3 |
|  | 1 μm | 4.4% | 6.2% | 25.2 |
|  | 0.5 μm | 1.6% | 14.3% | 27.8 |
|  | 0.3 μm | 0.7% | 22.4% | 28.6 |
| 46 inches | 3 μm | 45.9% | 3.2% | 8.9 |
|  | 1.5 μm | 42.0% | 5.39% | 11.6 |
|  | 1 μm | 35.0% | 7.0% | 12.9 |
|  | 0.5 μm | 18.4% | 10.9% | 15.0 |
|  | 0.3 μm | 8.7% | 14.6% | 16.2 |

Figure 13:
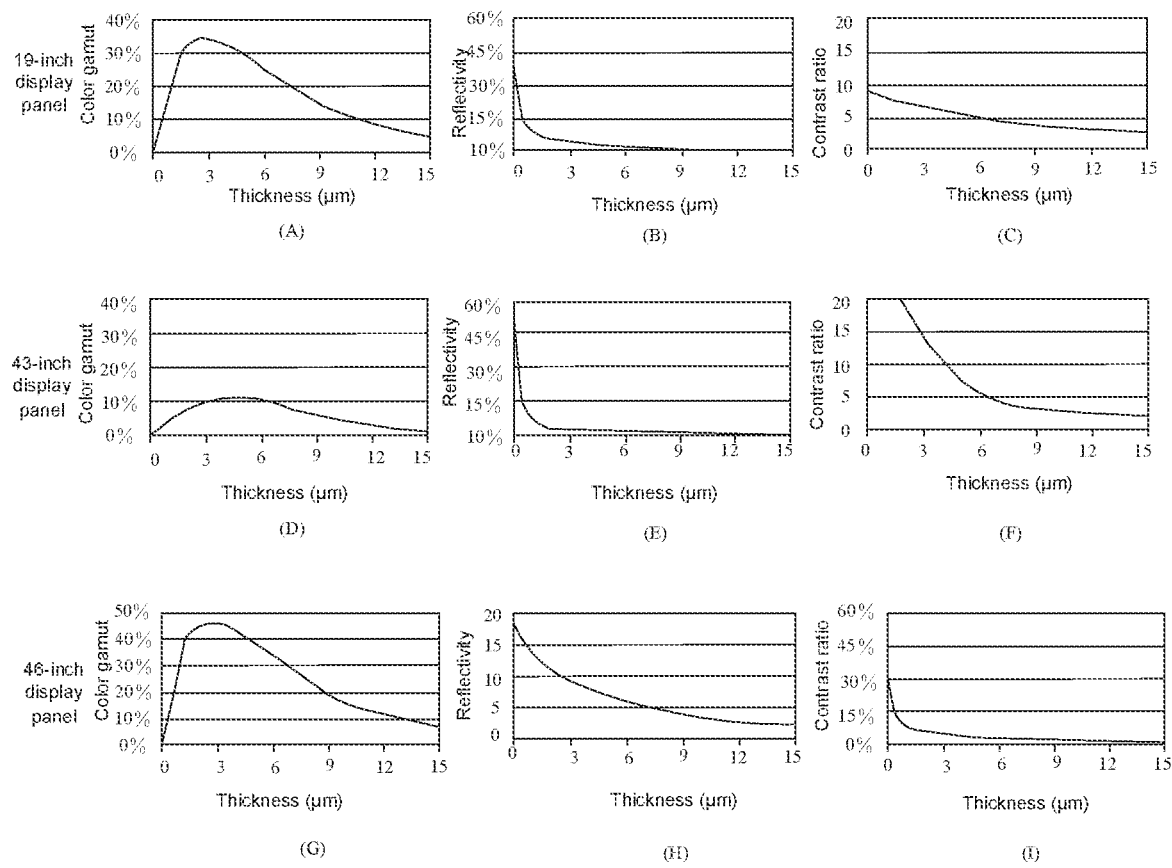
FIG. 13 is a graph showing relationships between thicknesses of filter layers in display panels of different sizes, and color gamut, reflectivity and contrast ratio, in accordance with some embodiments.

Here, Table 1 provides influence of thicknesses of filter layers in display panels (such as the display panel 100 in FIGS. 7A and 7B) of different sizes on the color gamut, the reflectivity and the contrast ratio. Moreover, (A) to (C) in FIG. 13 provide relationships between the thickness of the filter layer of the 19-inch display panel, and the color gamut, the reflectivity and the contrast ratio, respectively; (D) to (F) in FIG. 13 provide relationships between the thickness of the filter layer of the 43-inch display panel, and the color gamut, the reflectivity and the contrast ratio, respectively; (G) to (I) in FIG. 13 provide relationships between the thickness of the filter layer of the 46-inch display panel, and the color gamut, the reflectivity and the contrast ratio, respectively. It can be seen that, as the thickness of the filter layer gradually increases, the reflectivity of the display panel gradually decreases, the contrast ratio gradually decreases, and the color gamut gradually increases first and then gradually decreases.

It will be noted that, the liquid crystal cell 10 herein may be a liquid crystal cell in a transmissive display apparatus. In this way, there is no need to redesign the structure of the liquid crystal cell applied to the reflective display apparatus, and a production cost may be saved. For example, when a liquid crystal cell in a normally black mode of the transmissive ADS display apparatus is used in the reflective display apparatus, the display mode of the liquid crystal cell is a normally white mode. For example, in the transmissive display apparatus, the liquid crystal cell is in the dark state when the liquid crystal molecules of the liquid crystal cell are in a non-working state (i.e., a state that the liquid crystal molecules are not subjected to the electric field), and the liquid crystal cell is in the bright state when the liquid crystal molecules are in a working state (i.e., a state that the liquid crystal molecules are subjected to the electric field). The liquid crystal cell is applied to the reflective display apparatus, the liquid crystal cell is in the bright state when the liquid crystal molecules of the liquid crystal cell are in the non-working state (that is, the state that the liquid crystal molecules are not subjected to the electric field), and the liquid crystal cell is in the dark state when the liquid crystal molecules in the working state (that is, the state that the liquid crystal molecules are subjected to the electric field). Thus, the liquid crystal cell is converted from the normally black mode to the normally white mode.

In some embodiments, as shown in FIG. 1, the display apparatus 200 further includes a data processor 210. The data processor 210 is coupled to the display panel 100. The data processor 210 is configured to invert input first image data to obtain second image data. The display panel 100 is configured to display an image according to the second image data. For example, the display panel 100 may display an image corresponding to the first image data according to the second image data.

Figure 14:
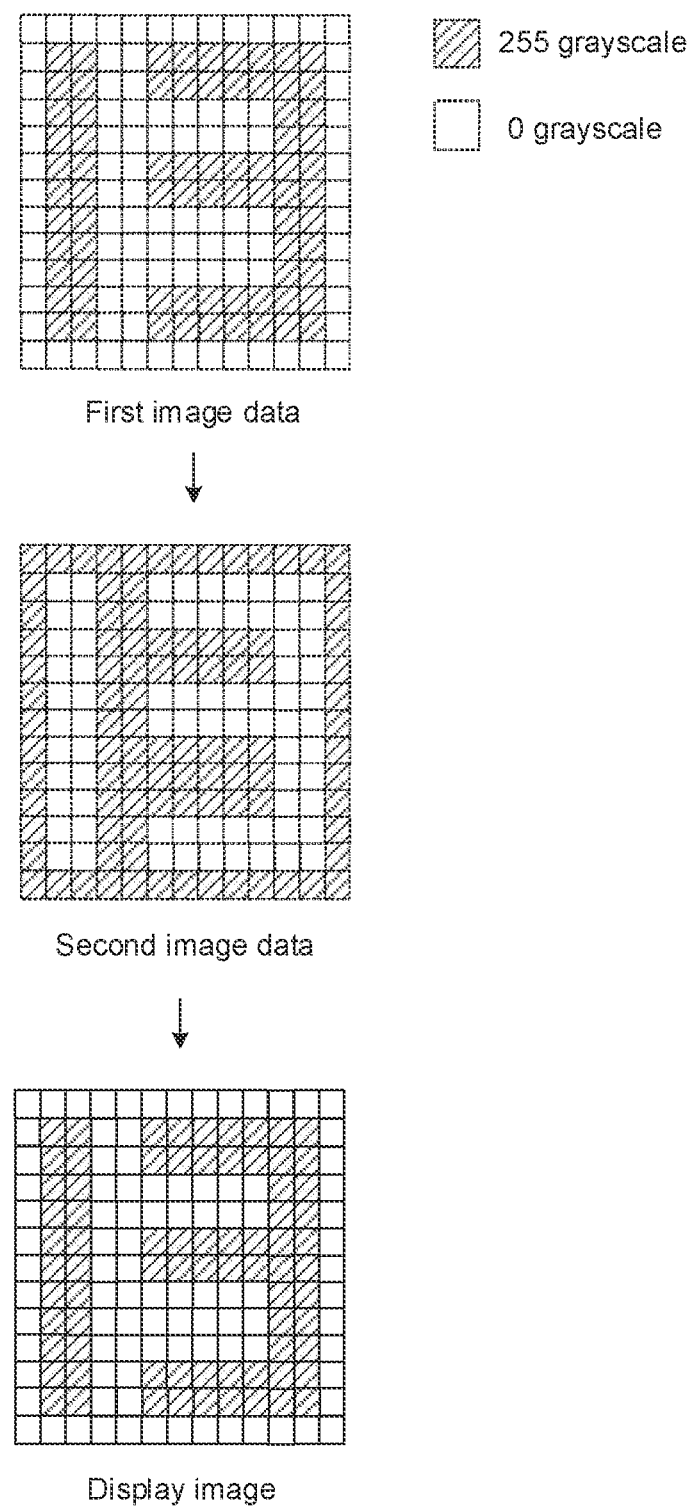
FIG. 14 is a diagram showing a process of data processing of a display image, in accordance with some embodiments.

For example, the first image data and the second image data may be digital signals. For example, the display apparatus adopts 8-bit grayscales. That is, the grayscales are in a range of 0 to 255, inclusive. In other words, the grayscales are in a range of 00000000 to 11111111, inclusive. For example, in a case where grayscale data of the first image data is 00000000 (0 grayscale), the data processor 210 inverts the first image data to obtain second image data, and grayscale data of the second image data is 11111111 (255 grayscale); in a case where grayscale data of the first image data is 00000001 (1 grayscale), the data processor 210 inverts the first image data to obtain the second image data, and grayscale data of the second image data is 11111110 (254 grayscale); in a case where grayscale data of the first image data is 00000010 (2 grayscale), the data processor 210 inverts the first image data to obtain the second image data, and grayscale data of the second image data is 11111101 (253 grayscale); in a case where grayscale data of the first image data is 11111111 (255 grayscale), the data processor 210 inverts the first image data to obtain the second image data, and grayscale data of the second image data is 00000000 (0 grayscale). For example, referring to FIG. 14, the data processor inverts the 0 grayscale of the first image data to obtain the 255 grayscale of the second image data, and inverts the 255 grayscale of the first image data to obtain the 0 grayscale of the second image data. In this way, the image displayed by the display apparatus according to the second image data is same as the image corresponding to the first image data.

In this case, if an image input into the display apparatus is a black image, an image actually displayed by the display apparatus is a white image; if the image input into the display apparatus is a white image, an image actually displayed by the display apparatus is a black image. For example, grayscale data corresponding to the black image input into the data processor of the display apparatus is 00000000 (that is, all grayscale data of the first image data is 00000000), and data output by the data processor is 11111111 (that is, all grayscale data of the second image data is 11111111). In this case, the electric field is created between the first electrode and the second electrode in the liquid crystal cell, and the liquid crystal molecules are in the working state. Therefore, referring to FIG. 5, the display panel 100 is in the dark state, and the display panel 100 displays the black image corresponding to the 0 grayscale. For example, grayscale data corresponding to the white image input into the data processor of the display apparatus is 1111111 (that is, all grayscale data of the first image data is 1111111), and the data output by the data processor is 00000000 (that is, all grayscale data of the second image data is 00000000). In this case, the electric field is not created between the first electrode and the second electrode in the liquid crystal cell, and the liquid crystal molecules are in the non-working state. Therefore, referring to FIG. 5, the display panel 100 is in the bright state, and the display panel 100 displays the white image corresponding to the 255 grayscale. As a result, the input image and the output image (i.e., the display image) of the display apparatus have the same grayscale data, which avoids an abnormality of display data.

For example, in a case where the display apparatus 200 displays a black and white image, the viewing angle of the display apparatus 200 may be increased to about 70°. In addition, under different viewing angles, the display of the display apparatus may be normal, and the displayed color is not deflected, which may satisfy needs of users for a large-angle display.

For example, the data processor may be arranged in a timing controller (TCON), or may be coupled to the timing controller. For example, a source driver in the display apparatus may provide driving signals to the display panel according to the second image data, so as to drive the display panel to display the image. For example, the data processor may be achieved in a form of hardware, or may be achieved in a form of software functional unit. For example, in a case where the data processor is achieved in a form of software, the data processor may be achieved by a software functional module obtained after at least one processor reads the program codes stored in a memory. For example, in a case where the data processor is achieved in a form of hardware, the data processor may be achieved by a logic circuit including a NOT gate or a swap circuit. For example, the data processor may achieve that an input is 0 and an output is 1.

The foregoing descriptions are merely specific implementation manners of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:
    a liquid crystal cell including a first substrate, a second substrate and a liquid crystal layer, wherein the first substrate and the second substrate are disposed opposite to each other, and the liquid crystal layer is sandwiched between the first substrate and the second substrate;
    an optical layer disposed on a side of the first substrate of the liquid crystal cell away from the second substrate, wherein the optical layer is configured to transmit part of light incident onto the optical layer whose polarization direction is parallel to a transmission axis of the optical layer, and reflect a remaining part of the light incident onto the optical layer;
    a first polarization structure disposed on a side of the optical layer away from the liquid crystal cell, wherein the first polarization structure is configured to transmit part of light incident onto the first polarization structure whose polarization direction is parallel to a transmission axis of the first polarization structure, and absorb a remaining part of the light incident onto the first polarization structure;
    a second polarization structure disposed on a side of the liquid crystal cell away from the optical layer, wherein the second polarization structure is configured to transmit part of light incident onto the second polarization structure whose polarization direction is parallel to a transmission axis of the second polarization structure, and absorb a remaining part of the light incident onto the second polarization structure; and the transmission axis of the first polarization structure is perpendicular to the transmission axis of the optical layer, and the transmission axis of the second polarization structure is perpendicular to or parallel to the transmission axis of the optical layer; and
    a scattering film disposed on a side of the liquid crystal cell proximate to the optical layer and between the liquid crystal cell and the optical layer,
    wherein the optical layer includes:
        a plurality of first optical films, the plurality of first optical films being birefringent; and
        a plurality of second optical films, the plurality of second optical films being single-refractive, wherein in a direction perpendicular to a plane where the display panel is located, the plurality of first optical films and the plurality of second optical films are alternately stacked,
    wherein one of a first optical film in the plurality of first optical films and a second optical film in the plurality of second optical films is directly bonded to the scattering film.

2. The display panel according to claim 1, wherein the transmission axis of the second polarization structure is parallel to the transmission axis of the first polarization structure.

3. The display panel according to claim 1, wherein in a first direction in a plane where the optical layer is located, a refractive index of the first optical film is greater than a refractive index of the second optical film; in a second direction in the plane where the optical layer is located, another refractive index of the first optical film is equal to the refractive index of the second optical film; and the first direction is perpendicular to the second direction.

4. The display panel according to claim 1, wherein the transmission axis of the optical layer is in a range of 0° to 180°, inclusive; and the transmission axis of the optical layer is parallel to a plane where the display panel is located.

5. The display panel according to claim 1, wherein a scattering axis of the scattering film is in a range of 0° to 90°, inclusive; an included angle between the scattering axis and a direction perpendicular to a plane where the display panel is located is in a range of 0° to 75°, inclusive.

6. The display panel according to claim 1, further comprising an anti-reflection film disposed on a side of the second polarization structure away from the optical layer.

7. The display panel according to claim 1, wherein the liquid crystal cell further includes:
    a first alignment layer disposed on the first substrate and on a side of the first substrate proximate to the liquid crystal layer, the first alignment layer having a first alignment direction; and
    a second alignment layer disposed on the second substrate and on a side of the second substrate proximate to the liquid crystal layer, the second alignment layer having a second alignment direction,
    wherein the first alignment direction is parallel or perpendicular to the second alignment direction.

8. The display panel according to claim 7, wherein the first alignment direction is parallel to the second alignment direction, and the second alignment direction is perpendicular to the transmission axis of the second polarization structure.

9. The display panel according to claim 8, wherein the liquid crystal cell further includes first electrodes and at least one second electrode, wherein the first electrodes are disposed on the first substrate;

the at least one second electrode is disposed on the first substrate;

the first electrodes are farther away from the liquid crystal layer than the at least one second electrode; and the second electrode is a slit electrode, and the first electrodes are planar electrodes.

10. The display panel according to claim 7, wherein the first alignment direction is perpendicular to the second alignment direction, and the second alignment direction is parallel to the transmission axis of the second polarization structure;

the liquid crystal cell further includes first electrodes and a second electrode;

the first electrodes are disposed on the first substrate;

the second electrode is disposed on the second substrate; and the first electrodes and the second electrode each are a planar electrode.

11. The display panel according to claim 1, wherein the liquid crystal cell further includes a plurality of filter layers disposed on the second substrate and on a side of the second substrate proximate to the liquid crystal layer, wherein thicknesses of the plurality of filter layers are each in a range of 0.3 μm to 3 μm, inclusive.

12. The display panel according to claim 1, wherein the liquid crystal cell further includes an electrostatic shielding pattern disposed on the second substrate and on a side of the second substrate proximate to the liquid crystal layer.

13. A display apparatus, comprising the display panel according to claim 1.

14. The display apparatus according to claim 13, further comprising a data processor coupled to the display panel, wherein the data processor is configured to invert input first image data to obtain second image data; and the display panel is configured to display an image according to the second image data.

15. A display panel, comprising:
a liquid crystal cell including a first substrate, a second substrate and a liquid crystal layer, wherein the first substrate and the second substrate are disposed opposite to each other, and the liquid crystal layer is sandwiched between the first substrate and the second substrate; an optical layer disposed on a side of the first substrate of the liquid crystal cell away from the second substrate, wherein the optical layer is configured to transmit part of light incident onto the optical layer whose polarization direction is parallel to a transmission axis of the optical layer, and reflect a remaining part of the light incident onto the optical layer;
a first polarization structure disposed on a side of the optical layer away from the liquid crystal cell, wherein the first polarization structure is configured to transmit part of light incident onto the first polarization structure whose polarization direction is parallel to a transmission axis of the first polarization structure, and absorb a remaining part of the light incident onto the first polarization structure; and
a second polarization structure disposed on a side of the liquid crystal cell away from the optical layer, wherein the second polarization structure is configured to transmit part of light incident onto the second polarization structure whose polarization direction is parallel to a transmission axis of the second polarization structure, and absorb a remaining part of the light incident onto the second polarization structure; and
the transmission axis of the first polarization structure is perpendicular to the transmission axis of the optical layer, and the transmission axis of the second polarization structure is perpendicular to or parallel to the transmission axis of the optical layer, wherein the liquid crystal cell further includes:
a first alignment layer disposed on the first substrate and on a side of the first substrate proximate to the liquid crystal layer, the first alignment layer having a first alignment direction; and
a second alignment layer disposed on the second substrate and on a side of the second substrate proximate to the liquid crystal layer, the second alignment layer having a second alignment direction,
wherein the first alignment direction is parallel to the second alignment direction, and the second alignment direction is perpendicular to the transmission axis of the second polarization structure.

16. The display panel according to claim 15, wherein the liquid crystal cell further includes first electrodes and at least one second electrode, wherein the first electrodes are disposed on the first substrate; the at least one second electrode is disposed on the first substrate;

the first electrodes are farther away from the liquid crystal layer than the at least one second electrode; and the second electrode is a slit electrode, and the first electrodes are planar electrodes.

17. A display apparatus, comprising the display panel according to claim 15.

18. A display panel, comprising:
a liquid crystal cell including a first substrate, a second substrate and a liquid crystal layer, wherein the first substrate and the second substrate are disposed opposite to each other, and the liquid crystal layer is sandwiched between the first substrate and the second substrate;
an optical layer disposed on a side of the first substrate of the liquid crystal cell away from the second substrate, wherein the optical layer is configured to transmit part of light incident onto the optical layer whose polarization direction is parallel to a transmission axis of the optical layer, and reflect a remaining part of the light incident onto the optical layer;
a first polarization structure disposed on a side of the optical layer away from the liquid crystal cell, wherein the first polarization structure is configured to transmit part of light incident onto the first polarization structure whose polarization direction is parallel to a transmission axis of the first polarization structure, and absorb a remaining part of the light incident onto the first polarization structure; and
a second polarization structure disposed on a side of the liquid crystal cell away from the optical layer, wherein the second polarization structure is configured to transmit part of light incident onto the second polarization structure whose polarization direction is parallel to a transmission axis of the second polarization structure, and absorb a remaining part of the light incident onto the second polarization structure; and
the transmission axis of the first polarization structure is perpendicular to the transmission axis of the optical layer, and the transmission axis of the second polarization structure is perpendicular to or parallel to the transmission axis of the optical layer, wherein the liquid crystal cell further includes:
a first alignment layer disposed on the first substrate and on a side of the first substrate proximate to the liquid crystal layer, the first alignment layer having a first alignment direction;

a second alignment layer disposed on the second substrate and on a side of the second substrate proximate to the liquid crystal layer, the second alignment layer having a second alignment direction, wherein the first alignment direction is perpendicular to the second alignment direction, and the second alignment direction is parallel to the transmission axis of the second polarization structure;

first electrodes disposed on the first substrate, the first electrodes each being a planar electrode; and a second electrode disposed on the second substrate, the second electrode being a planar electrode.

19. A display apparatus, comprising the display panel according to claim 18.

\* \* \* \* \*